(12) United States Patent
Gima et al.

(10) Patent No.: US 11,924,931 B2
(45) Date of Patent: Mar. 5, 2024

(54) GLASS

(71) Applicant: AGC Inc., Tokyo (JP)

(72) Inventors: Yuhei Gima, Tokyo (JP); Shunsuke Sadakane, Tokyo (JP)

(73) Assignee: AGC INC., Tokyo (JP)

( * ) Notice: Subject to any disclaimer, the term of this patent is extended or adjusted under 35 U.S.C. 154(b) by 676 days.

(21) Appl. No.: 17/103,242

(22) Filed: Nov. 24, 2020

(65) Prior Publication Data

US 2021/0084720 A1 Mar. 18, 2021

Related U.S. Application Data

(63) Continuation of application No. PCT/JP2019/021132, filed on May 28, 2019.

(30) Foreign Application Priority Data

May 30, 2018 (JP) .................................. 2018-103407

(51) Int. Cl.
*H05B 3/84* (2006.01)
*B32B 17/10* (2006.01)
(Continued)

(52) U.S. Cl.
CPC ............... *H05B 3/84* (2013.01); *B32B 17/10* (2013.01); *B32B 17/10018* (2013.01);
(Continued)

(58) Field of Classification Search
CPC . H05B 3/84; H05B 3/141; H05B 3/03; H05B 2203/007; H05B 2203/017;
(Continued)

(56) References Cited

U.S. PATENT DOCUMENTS 8,383,988 B2  2/2013 Grunert et al.
8,907,250 B2  12/2014 Bressand et al.
(Continued)

FOREIGN PATENT DOCUMENTS

CN  111566067 A   8/2020
EP  3 718 983 A1  10/2020
(Continued)

OTHER PUBLICATIONS

International Searching Authority, "International Search Report," issued in connection with International Patent Application No. PCT/JP2019/021132, dated Jul. 30, 2019.
(Continued)

*Primary Examiner* — Brian W Jennison
(74) *Attorney, Agent, or Firm* — Foley & Lardner LLP

(57) ABSTRACT

The present invention relates to glass for vehicles including a glass plate; an information transmitting/receiving area, defined in the glass, via which a device mounted in a vehicle transmits or receives information; and a film that heats the information transmitting/receiving area, the film being attached to an area overlapping the information transmitting/receiving area in an interior side of the glass plate in a vehicle in a planar view; wherein the film includes a substrate, a heating element formed on the substrate, and a busbar connected to the heating element; the film has a heating zone divided into two or more heating areas; and the two or more of the heating areas share at least one busbar and are connected in series.

19 Claims, 10 Drawing Sheets

(51) Int. Cl.
  *B60J 1/00* (2006.01)
  *B60S 1/02* (2006.01)
  *H05B 3/03* (2006.01)
  *H05B 3/14* (2006.01)

(52) U.S. Cl.
  CPC ........... *B32B 17/10385* (2013.01); *B60J 1/00* (2013.01); *B60S 1/026* (2013.01); *H05B 3/141* (2013.01); *B32B 2605/006* (2013.01); *H05B 3/03* (2013.01); *H05B 2203/007* (2013.01); *H05B 2203/013* (2013.01); *H05B 2203/016* (2013.01)

(58) Field of Classification Search
  CPC .............. H05B 2203/016; B32B 17/10; B32B 17/10018; B32B 17/10385; B32B 2605/006; B60J 1/00; B60S 1/026
  See application file for complete search history.

(56) References Cited

U.S. PATENT DOCUMENTS

| | | | |
|---|---|---|---|
| 11,535,008 B2 * | 12/2022 | Aoki | ........... B32B 3/08 |
| 2012/0103960 A1 * | 5/2012 | Bressand | ............. H05B 3/84 |
| | | | 219/203 |
| 2013/0092676 A1 * | 4/2013 | Offermann | ........ B32B 17/10036 |
| | | | 219/203 |
| 2015/0382406 A1 * | 12/2015 | Choi | ........................ H05B 3/84 |
| | | | 219/547 |
| 2017/0036646 A1 | 2/2017 | Kagaya et al. | |
| 2019/0337270 A1 * | 11/2019 | Sadakane | ............ G02B 27/0101 |
| 2019/0339517 A1 * | 11/2019 | Sadakane | ............... B32B 27/306 |
| 2020/0391577 A1 * | 12/2020 | Bard | ................. B32B 17/10889 |
| 2021/0001695 A1 * | 1/2021 | Ogawa | ..................... H05B 3/86 |
| 2021/0021745 A1 * | 1/2021 | Mannheim Astete | ....................... B32B 17/10165 |
| 2021/0162716 A1 * | 6/2021 | Gima | ................ B32B 17/10192 |

FOREIGN PATENT DOCUMENTS

| | | |
|---|---|---|
| JP | 2011-510893 A | 4/2011 |
| JP | 2012-530646 A | 12/2012 |
| JP | 6065221 B2 | 1/2017 |
| JP | 2017-214059 A | 12/2017 |
| JP | 2019-099405 A | 6/2019 |

OTHER PUBLICATIONS

International Searching Authority, "Written Opinion," issued in connection with International Patent Application No. PCT/JP2019/021132, dated Jul. 30, 2019.

* cited by examiner

GLASS

CROSS-REFERENCE TO RELATED APPLICATIONS

This U.S. non-provisional application is a continuation application of and claims the benefit of priority under 35 U.S.C. 365(c) from PCT International Application PCT/JP2019/021132 filed on May 28, 2019, which is designated the U.S., and is based upon and claims the benefit of priority of Japanese Patent Application No. 2018-103407 filed on May 30, 2018, the entire contents of which are incorporated herein by reference.

TECHNICAL FIELD

The present invention relates to glass.

BACKGROUND OF THE INVENTION

In recent years, for the purpose of improving vehicle safety, vehicles with the ability to automatically avoid collisions with vehicles travelling travelling ahead and pedestrians have been developed. For example, for such a vehicle, a device such as a camera is mounted in the vehicle to transmit and receive information such as road conditions via vehicle glass (e.g., windshield or the like) (see, for example, Patent Document 1).

In cold climates, however, the freezing of moisture adhering to the glass and the fogging of the glass caused by the difference in temperature between the inside and outside of the car may cause the loss of the function of these devices. Accordingly, in order to avoid this drawback, a technique has been proposed in which a beating film is applied to an area where a device placed on the interior side of the glass in a vehicle is provided (see, for example, Patent Document 2).

RELATED-ART DOCUMENT

Patent Documents

Patent Document 1: Japanese Unexamined Patent Application Publication (Translation of PCT Application) No. 2011-510893

Patent Document 2: Japanese Unexamined Patent Application Publication (Translation of PCT Application) No. 2012-530646

SUMMARY OF THE INVENTION

Problems to be Solved by the Invention

However, in order to uniformly heat a film, it is preferable that the planar shape of the film is rectangular. However, when a film is applied to an area where a device is placed on the interior side of the vehicle, interference with other components constrains the shape of the film and makes it difficult to form the film in the desired shape. If the shape of the film is non-rectangular, the film cannot be uniformly heated, and the sensing performance of the device is impaired due to freezing or fogging of the glass.

The present invention has been made in view of the above-described points, and an object of the present invention is to provide glass for a vehicle in which the sensing performance of a device is not easily impaired due to freezing, fogging, or the like.

Means for Solving the Problems

The present invention relates to a glass for vehicles including glass plates; an information transmitting/receiving area defined in the glass in which a device mounted in a vehicle transmits and/or receives information; and a film for heating the information transmitting/receiving area, the film being attached to an area overlapping the information transmitting/receiving area in a planar view inside the glass plate; wherein the film includes a substrate, a heating element formed on the substrate, and a busbar connected to the heating element; the film has a heating zone divided into two or more heating areas; and the two or more of the heating areas share at least one busbar and are connected in series.

Effect of the Invention

According to a disclosure of the present invention, the glass for a vehicle in which the sensing performance of the device is not easily impaired by freezing, fogging or the like can be provided.

DETAILED DESCRIPTION

Figure 1A:
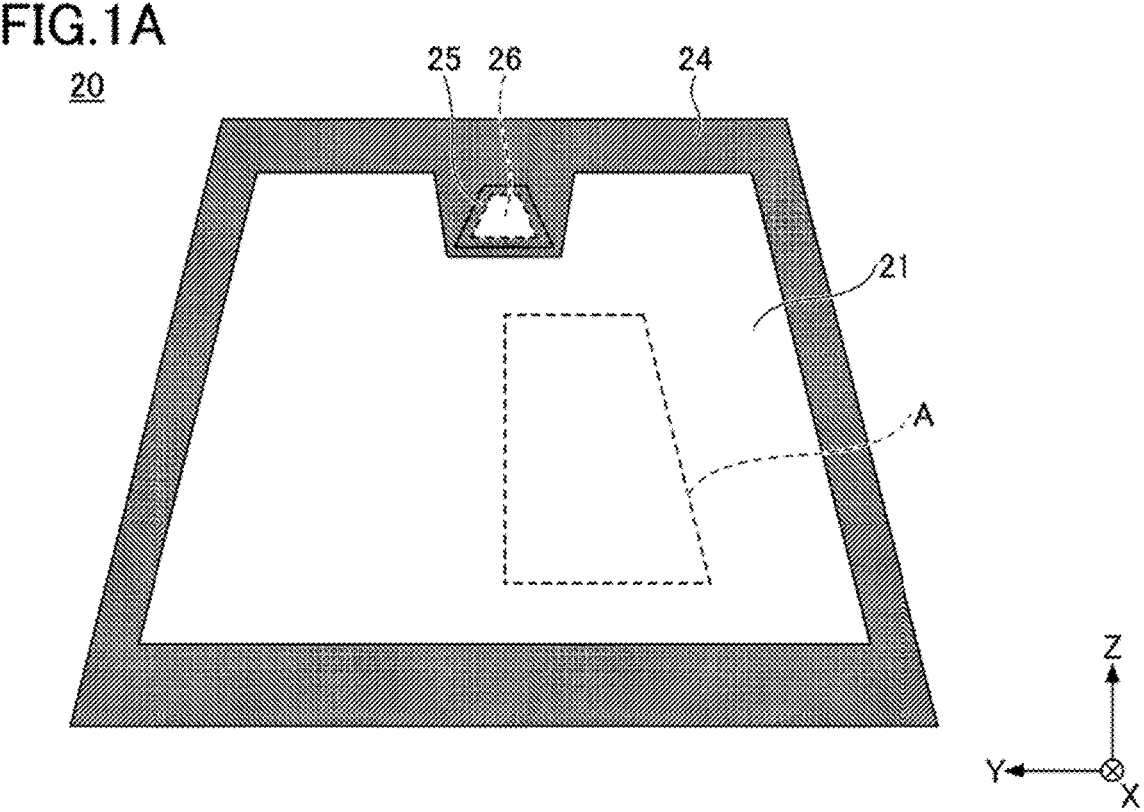
FIG. 1A is a diagram illustrating a windshield for a vehicle according to a first embodiment.

Hereinafter, embodiments for carrying out the invention with reference to the drawings will be described. In each drawing, the same components are indicated by the same reference numerals and overlapping descriptions may be omitted. In each drawing, the size and shape may be partially exaggerated to facilitate understanding of the subject matter of the invention.

Hereinafter, the windshield for a vehicle will be described by way of example, but the windshield is not limited thereto.

The glass according to the embodiments is applicable to applications other than the windshield for a vehicle. Also, although the term vehicle particularly refers to an automobile, the term also refers a mobile unit that has glass such as a train, ship, an aircraft, and the like.

A planar view refers to viewing a predetermined area of a windshield from the normal direction of the predetermined area, and a planar shape refers to viewing a predetermined area of a windshield from the normal direction of the predetermined area. In the specification, the top and bottom refer to the Z-axis direction of the drawings, and the left and right refer to the Y-axis direction of the drawings.

First Embodiment

Figure 1B:
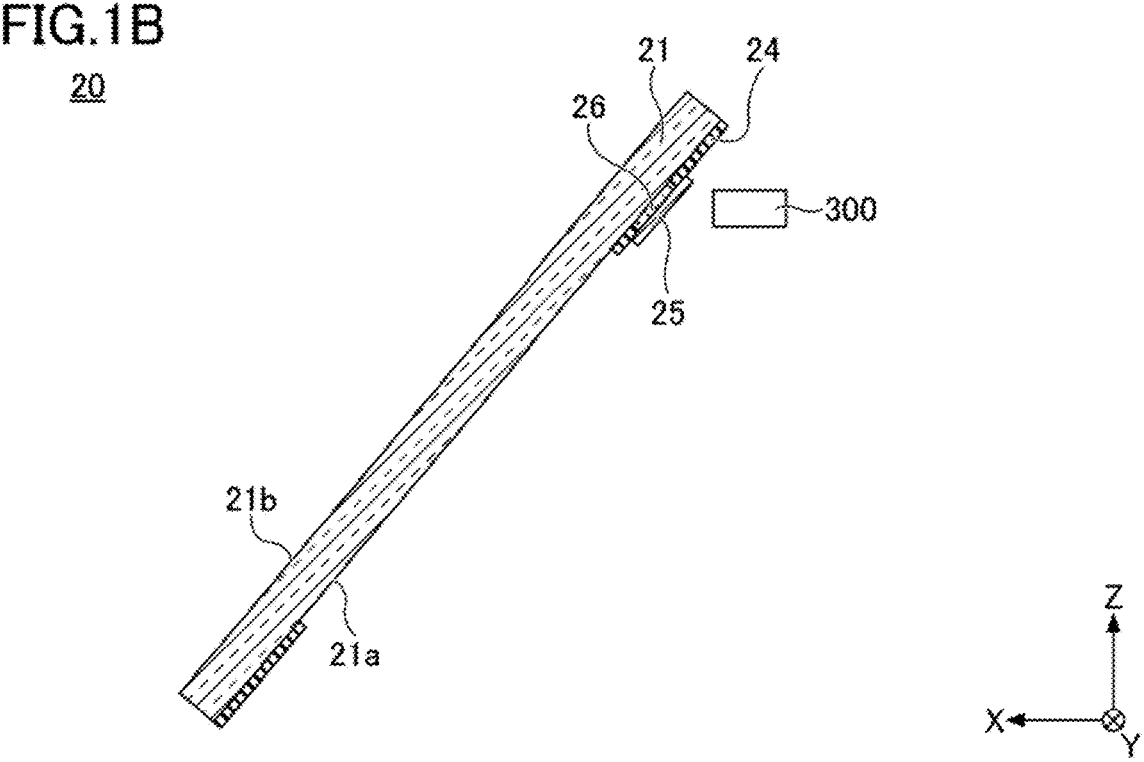
FIG. 1B is a diagram illustrating a windshield for a vehicle according to a first embodiment.

FIGS. 1A and 1B are diagrams illustrating a windshield for a vehicle according to the first embodiment. FIG. 1A is a schematic diagram illustrating a view of a windshield viewed from inside to outside of a vehicle (wherein the windshield 20 is mounted to a vehicle in an upward direction in the Z direction). FIG. 1B is a cross-sectional view of the windshield 20 shown in FIG. 1A cut in the XZ direction as viewed from the Y direction. Although FIG. 1B illustrates the device 300 with the windshield 20 for convenience, the device 300 is not a component of the windshield 20.

As illustrated in FIGS. 1A and 1B, the windshield 20 is a sheet of vehicle glass and has a glass plate 21, a shielding layer 24, and a film 25.

In the windshield 20, the vehicle-interior side surface 21a of the glass plate 21 (the inner surface of the windshield 20) and vehicle-exterior side surface 21b of the glass plate 21 (the outer surface of the windshield 20) may be flat or curved surfaces.

The glass plate 21 may be inorganic glass, organic glass, or the like. Examples of the inorganic glass include soda lime glass, aluminosilicate, and the like. Where the glass plate 21 is inorganic glass, for example, it may be produced by a float method.

The shielding layer 24 is provided at the periphery of the vehicle-interior side surface 21a on the glass plate 21. The shielding layer 24 is an opaque layer and can be formed, for example, by applying a predetermined color of printing ink to the glass surface and burning the ink to the glass surface. The shielding layer 24 is, for example, an opaque (e.g., black) colored ceramic layer. The presence of the opaque shielding layer 24 at the periphery of the windshield 20 prevents ultraviolet-ray deterioration of resin, such as urethane, holding the periphery of the windshield 20 in the body or an adhesive member affixing a bracket to the (front) windshield 20. The bracket is for securing the device 300.

The windshield 20 has a test area A defined by JIS Standard R3212. The windshield 20 also defines an information transmitting/receiving area 26. The test area A is positioned inside an area surrounded by the shielding layer 24 in a planar view, and the information transmitting/receiving area 26 is positioned within an opening in the shielding layer 24.

The information transmitting/receiving area 26 functions as the area via which the device 300 transmits and/or receives information when the device 300 is placed on the upper peripheral edge of the windshield 20 in the vehicle. The planar shape of the information transmitting/receiving area 26 is not particularly limited, but is, for example, an isosceles trapezoid. The information transmitting/receiving area 26 is preferably located above the test area A because it does not interfere with the operator's view when the windshield 20 is mounted on the vehicle and it is advantageous for transmitting and/or receiving information.

The device 300 is a device that transmits and/or receives information. Examples of the device 300 include a camera that acquires visible light or infrared light, a millimeter wave radar, an infrared laser, and the like. In addition to the device 300, other devices may be positioned in the vehicle to transmit and/or receive information via the information transmitting/receiving area 26. Here, "signal" refers to electromagnetic waves including millimeter waves, visible light, infrared light, or the like.

The film 25 is a film capable of heating the information transmitting/receiving area 26 on the interior side of the glass plate 21, in a planar view, outside the test area A and on an area overlapping the information transmitting/receiving area 26. The planar shape of the film 25, for example, is similar to the planar shape of the information transmitting/receiving area 26 and may be slightly larger than the information transmitting/receiving area 26 or slightly smaller than the information transmitting/receiving area 26.

A visible light transmittance Tv of the information transmitting/receiving area 26 including the film 25 is preferably 70% or more. The haze of the information transmitting/receiving area 26 including the film 25 is preferably 1% or less.

Figure 2A:
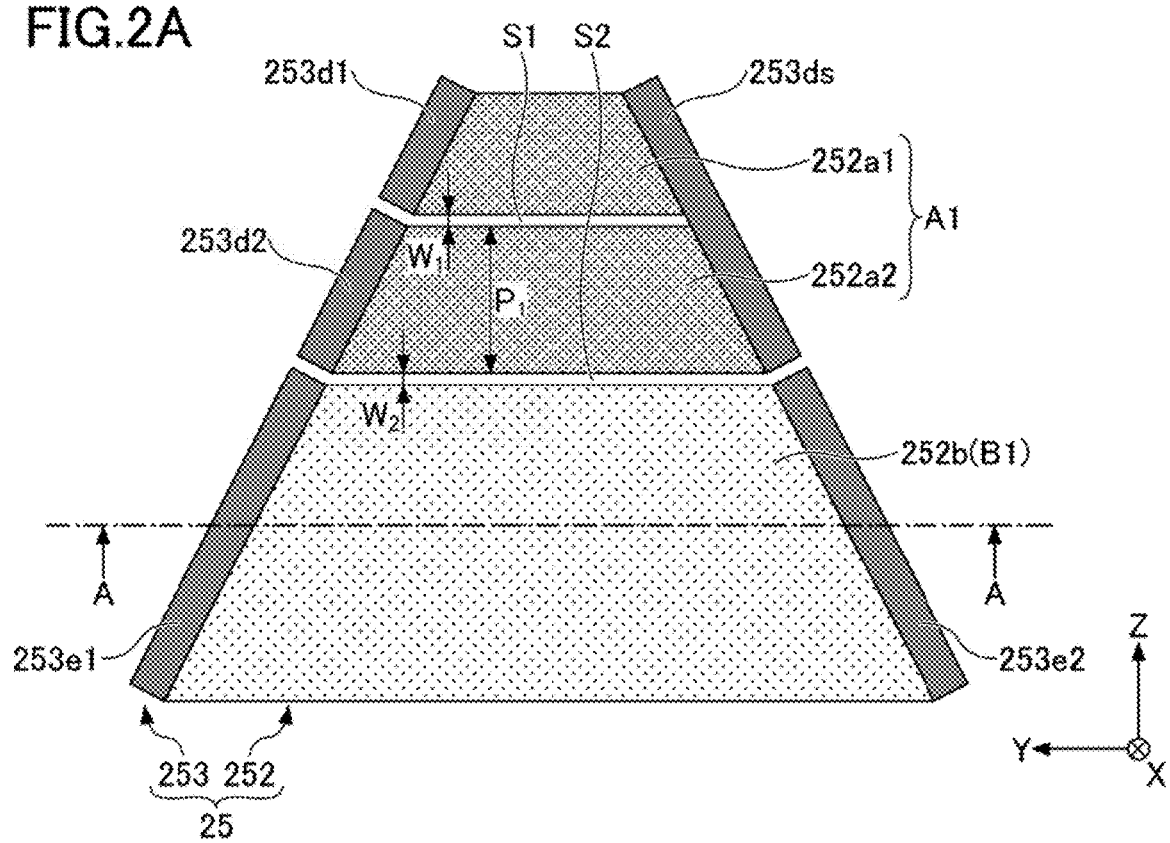
FIG. 2A is a diagram illustrating a film according to the first embodiment.
Figure 2B:
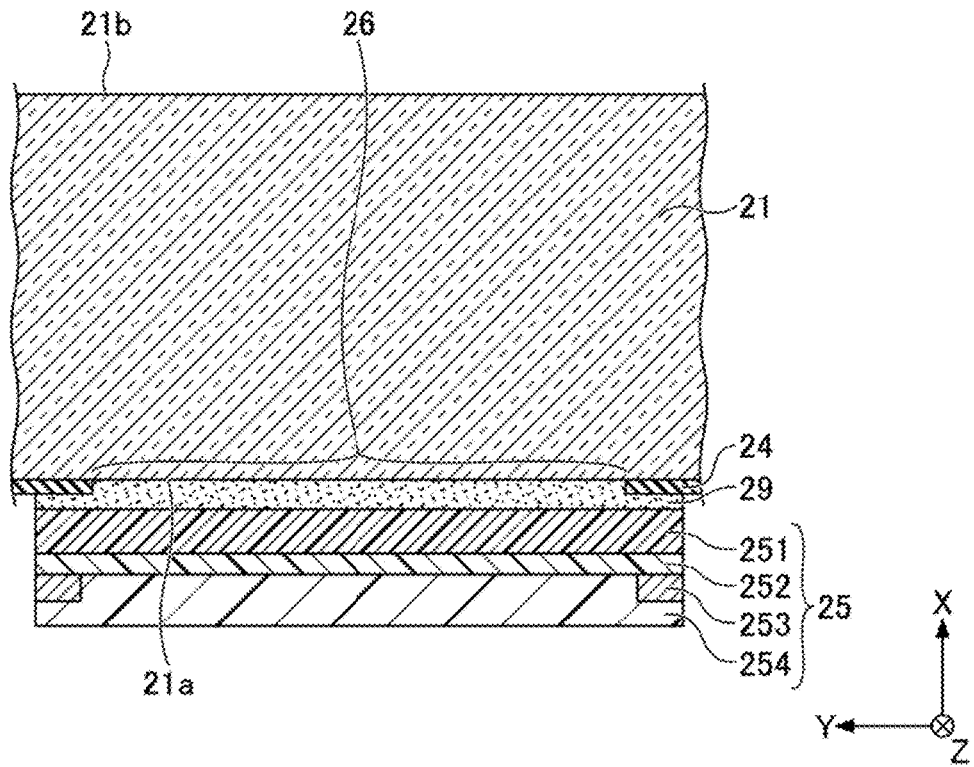
FIG. 2B is a diagram illustrating a film according to the first embodiment.

FIGS. 2A and 2B are diagrams illustrating a film according to the first embodiment. FIG. 2A is a schematic planar view illustrating a view of the film viewed from inside to outside of the vehicle cabin. FIG. 2B is a cross-sectional view along line A-A of FIG. 2A. In FIG. 2A, the glass plate 21, the shielding layer 24 and the protective film 254 are not shown.

The film 25 includes a substrate 251, a heating element 252, a busbar 253, and a protective film 254. The protective film 254, however, is not an essential component of the film 25 and thus may be provided as needed.

The outer surface of the substrate 251 of the film 25 is adhered via an adhesive layer 29 to the vehicle-interior side surface 21a of the glass plate 21 located within the information transmitting/receiving area 26 and to the inner surface of the shielding layer 24 adjacent the periphery of the information transmitting/receiving area 26. The ends of the film 25 need not overlap the shielding layer 24.

The adhesive layer 29 can be formed from at least one resin selected from the group, for example, consisting of an acrylic, acrylate, urethane, urethane acrylate, epoxy, epoxy acrylate, polyolefin, modified olefin, polypropylene, ethylene vinyl alcohol, vinyl chloride, chloroprene rubber, cyanoacrylate, polyamide, polyimide, polystyrene, and polyvinyl butyral. The thickness of the adhesive layer 29 is, for example, 5 μm or more and 120 μm or less.

For example, a plastic film or glass may be used as the substrate 251. The thickness of the substrate 251 may be 5 μm or more and 500 μm or less, but preferably 10 μm or more and 200 μm or less, and more preferably 50 μm or more and 150 μm or less.

The plastic film forming substrate 251 can be formed from a homopolymer or copolymer of at least one monomer selected from the group consisting of, for example, polyester (e.g., polyethylene terephthalate, polyethylene naphthalate, etc.), polyamide, polyether, polysulfone, polyether sulfone, polycarbonate, polyarylate, polyetherimide, polyether ether ketone, polyimide, aramid, polybutylene terephthalate, polyvinyl butyral, and polyvinyl acetate. Examples of the material of the glass that forms the substrate 251 include inorganic glass such as soda lime glass, aluminosilicate, and the like or organic glass and the like.

The heating element 252 is formed on the substrate 251. The heating element 252 can be formed from a conductive thin film such as, for example, gold, silver, copper, or tin-doped indium oxide. The heating element 252 can be formed using, for example, a physical vapor deposition (PVD), such as a sputtering method, a vacuum deposition method or an ion plating method. The heating element 252 may be formed using a chemical vapor deposition (CVD) or wet coating method.

Metals such as a heating wire or mesh wire may be used as the heating element 252. The materials of metal such as a heating wire or mesh wire constituting the heating element 252 include, but are not limited to, (i) at least one metal selected from the group consisting of gold, silver, copper, aluminum, nickel, and tungsten, (ii) an alloy containing two or more metals selected from the group, and the like.

The heating element 252 may include a layer that adjusts the color tone and reflectance. For example, the laminate preferably includes a film formed from a high refractive index material and a film formed from a low refractive index material. The laminate can be selected by considering the required degree of anti-reflection and productivity. Materials constituting a film formed from a high refractive index material includes, for example, one or more types of materials selected from metal oxides such as silicon nitride, indium oxide, tin oxide, niobium oxide, titanium oxide, zirconium oxide, cerium oxide, tantalum oxide, aluminum oxide, zinc oxide, and the like. Materials constituting a film formed from a low refractive index material includes, for example, one or more types of materials selected from silicon oxide ($SiO_2$), a material including a mixed oxide of Si and Sn, a material including an oxide mixed with Si and Zr, and a material including a mixed oxide of Si and Al.

The sheet resistance of the heating element 252 is preferably less than or equal to 150 Ω/squared.

The busbar 253 extends along the end of the substrate 251 and is electrically connected to the heating areas 252a1, 252a2, and 252b, which will be described below. The busbar 253 is a generic term for busbars 253d1, 253d2, 253ds, 253e1, and 253e2 to be described later.

As the busbar 253, silver paste is preferably used. The silver paste may be applied, for example, by a printing process such as screen printing. The busbar 253 may be formed of (i) at least one metal selected from the group consisting of silver, copper, tin, gold, aluminum, iron, tungsten, and chromium, (ii) an alloy containing two or more metals selected from the group, or (iii) a conductive organic polymer, such as by sputtering. A copper ribbon or flat knitted copper wire may also be used as the busbar 253.

The protective film 254 is a film that protects the heating element 252 and the busbar 253. Examples of the material of the protective film 254 are polyethylene terephthalate and the like.

The heating element 252 is divided into two or more heating areas by at least one slit, wherein the two or more heating areas share at least one busbar and are connected in series.

In the film 25 according to the first embodiment, for example, the heating element 252 is provided with two slits S1 and S2 extending in the Y direction (horizontal direction with the windshield 20 attached to the vehicle). The heating element 252 is divided into three heating areas 252a1, 252a2, and 252b by slits S1 and S2.

Slits S1 and S2 can be formed, for example, in an etching manner thereby partially removing the heating element 252 using an acid or the like. Slits S1 and S2 may be formed in a decoat manner thereby partially removing the heating element 252 using a laser or the like.

The width $W_1$ of the slit S1 and the width $W_2$ of the slit S2 are each preferably 0.3 mm or less, more preferably 0.2 mm or less, and further preferably 0.1 mm or less. When the width $W_1$ of the slit S1 and the width $W_2$ of the slit S2 are each larger than 0.3 mm the sensing performance of the device 300 is adversely affected. The width $W_1$ of the slit S1 and the width $W_2$ of the slit S2 are each 0.3 mm or less, so that the influence on the sensing performance of the device 300 can be reduced. By narrowing the width $W_1$ of the slit S1 and the width $W_2$ of the slit S2 to be each 0.2 mm or less, and further to be each 0.1 mm or less, the influence on the sensing performance of the device 300 can be further reduced.

In addition, the distance $P_1$ between the slit S1 and the slit S2 is preferably more than or equal to 10 mm. When the distance $P_1$ between slit S1 and slit S2 is less than 10 mm, the sensing performance of device 300 is adversely affected. However, when the distance $P_1$ is more than or equal to 10 mm or more, the effect on the sensing performance of device 300 can be reduced.

The busbar 253d1 is connected along the one end (first end) of the heating area 252a1, and the busbar 253ds is connected along the other end (second end) of the heating element 252. The busbar 253d2 is connected along the first end of the heating area 252a2 and the busbar 253ds is connected along the second end. The busbar 253ds is shared by heating areas 252a1 and 252a2, and heating areas 252a1 and 252a2 are connected in series via the busbar 253ds. The first heating zone A1 is configured by the heating areas 252a1 and 252a2. Here, a heating zone is an area that is heated by energizing a set of busbars.

The busbar 253e1 is connected along the first end of the heating area 252b, and the busbar 253e2 is connected along the second end of the heating area 252b. A second heating zone B1 is formed by the heating area 252b.

The first heating zone A1 and the second heating zone B1 are connected in parallel. That is, the voltage applied across busbar 253d1 and busbar 253d2 is the same as the voltage applied across busbar 253e1 and busbar 253e2.

One side of the busbars 253d1 and 253d2 is a positive electrode and is connected to the positive side of a power supply such as a battery mounted in a vehicle through a lead wire or the like. The other side of the busbar 253d1 and the busbar 253d2 is a negative electrode and is connected to the negative side of a power supply such as a battery mounted in a vehicle via a lead wire or the like. This energizes between busbar 253d1 and busbar 253d2.

When a current is supplied to the first heating zone A1 of the heating element 252 from a power source, such as a battery, via the busbar 253d1 and the busbar 253d2, the first heating zone A1 of the heating element 252 is heated. Since the first heating zone A1 and the second heating zone B1 are connected in parallel, the second heating zone B1 is also heated together with the first heating zone A1.

Heat generated in the first heating zone A1 and the second heating zone B1 warms the information transmitting/receiving area 26 of the windshield 20 and eliminates freezing and fogging of the surface of the glass plate 21 constituting the information transmitting/receiving area 26. This ensures good sensing by the device 300.

A non-contact power supply may be used for supplying power to the heating element 252. A non-contact power supply is a method of supplying power wirelessly without physical contact by connectors, wiring, or the like. For non-contact power supply, for example, an electromagnetic induction system that supplies power by electromagnetic induction while the coils provided in each of the non-contact power feeding units and the power receiving unit are in close proximity to each other can be used.

The positions of slits S1 and S2 can be defined such that the sum of the average interpolar distance of heating area 252a1 and the average interpolar distance of heating area 252a2 is equal to the average interpolar distance of heating area 252b. This allows the first heating zone A1 and the second heating zone B1 to generate the same amount of heat.

Figure 3A:
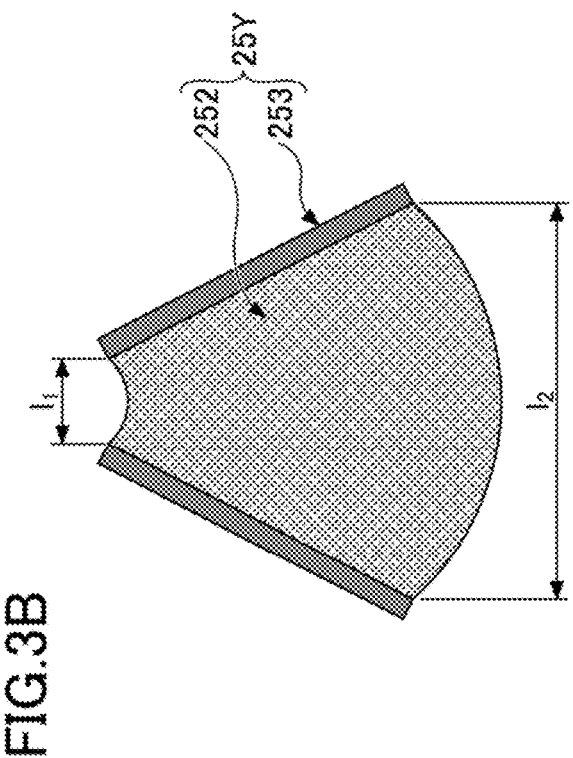
FIG. 3A is a diagram illustrating an interpolar distance of a busbar.
Figure 3B:
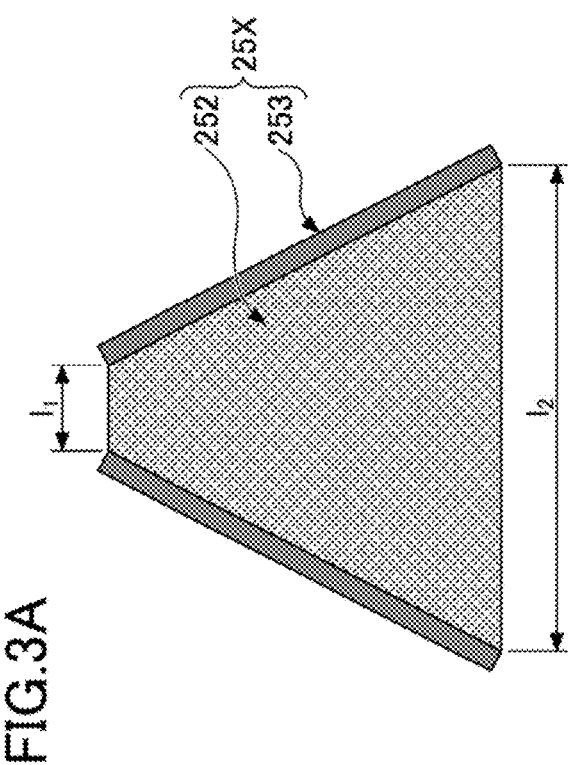
FIG. 3B is a diagram illustrating an interpolar distance of a busbar.
Figure 3C:
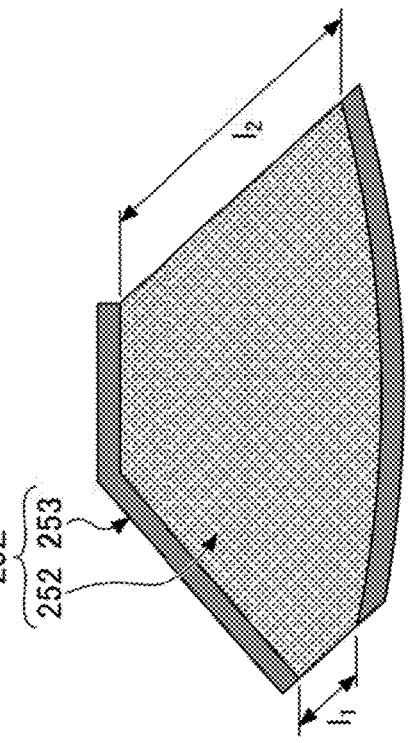
FIG. 3C is a diagram illustrating an interpolar distance of a busbar.

Here, the interpolar distance refers the linear distance between a pair of busbars with or without a slit. For example, as shown in FIGS. 3A to 3C, the minimum interpolar distance $l_1$ represents the linear distance where the distance between one set of busbars is shortest, and the maximum interpolar distance $l_2$ represents the linear distance where the distance between one set of busbars is longest. The average distance between poles is the average value of the minimum and maximum distance between poles.

The film 25X illustrated in FIG. 3A, the film 25Y illustrated in FIG. 3B, and the film 25Z illustrated in FIG. 3C are examples without slits. However, even if there are slits, the interpolar distance is specified in the same manner as when there are no slits.

When the film 25 is applied to the interior side of the glass plate 21, other components such as brackets of the device 300 are often obstructed, and the shape of the film 25 cannot be made into a simple rectangle. When the film 25 is not rectangular in shape and when no slits are provided as illustrated in FIGS. 3A to 3C, the interpolar distances of the busbars 253 vary greatly depending upon the area within the heating element 252. As a result, a distribution of heat is generated in the heating element 252, resulting in an area where sufficient heat generating performance is not obtained.

As a countermeasure, in the first embodiment, as illustrated in FIGS. 2A and 2B, the heating element 252 is divided into three heating areas 252a1, 252a2, and 252b by slits S1 and S2. The divided heating areas 252a1 and 252a2 share the busbar 253ds and are connected in series.

As described above, by dividing the heating element 252 into a plurality of heating areas, the change in the interpolar distance of the busbar within each heating area can be reduced, so that the generation of the heating distribution within the heating area can be suppressed a result, the windshield 20, which is unlikely to impair the sensing performance of the device 300 due to freezing, fogging or the like, can be achieved.

The planar shape of the film 25 is an example of an isosceles trapezoid. When the planar shape of the film 25 is not rectangular, a slit is provided in the heating element 252 to obtain the effect of dividing the heating element into a plurality of heating areas. In particular, when the ratio of the maximum interpolar distance squared to the minimum interpolar distance squared of a busbar is 1.2 or more, the effect of providing a sift in the heating element 252 to divide the heating element into a plurality of heating areas is significant. The same shall apply to the following embodiments.

Further, since the sight through distortion worsens when the shielding layer 24 is provided on the glass plate 21, the end of the shielding layer 24 may be separated from the information transmitting/receiving area 26, and a coloring layer having the same color as the shielding layer 24 may be provided on the peripheral portion of the film 25. Alternatively, an anti-fog or anti-reflection (AR) coating may be applied to the interior surface of the film 25.

Second Embodiment

In the second embodiment, an example in which the heating area is divided differently from the first embodiment is shown. In the second embodiment, the description of the same configuration portion as that of the embodiment described previously may be omitted.

Figure 4:
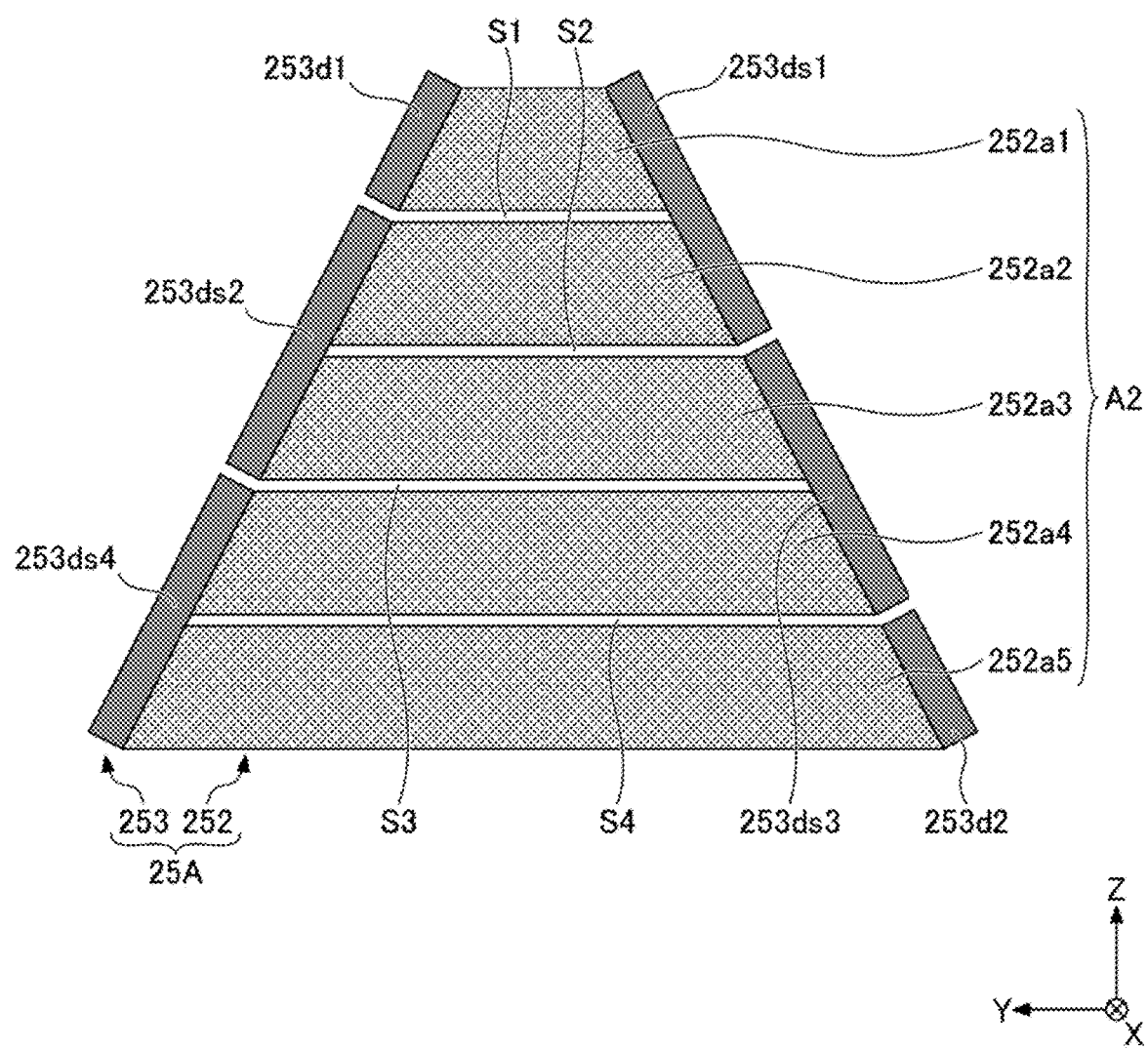
FIG. 4 is a diagram illustrating a film according to a second embodiment.

FIG. 4 is a diagram illustrating a film according to a second embodiment, and is a planar view schematically showing a view of the film viewed from inside to outside of a vehicle cabin. Since the cross-sectional view of the film is the same as that in FIG. 2B, the drawing is omitted.

In a film 25A according to the second embodiment, for example, the heating element 252 is provided with four slits S1, S2, S3, and S4 extending in the Y direction (horizontal direction with the windshield 20 attached to the vehicle). The heating element 252 is divided into five heating areas 252a1, 252a2, 252a3, 252a4, and 252a5 by the slits S1, S2, S3, and S4, respectively.

At heating element 252, the busbar 253d1 is connected along the first end of heating area 252a1 and the busbar 253ds1 is connected along the second end of the heating area 252a2. The busbar 253ds2 is connected along the first end of the heating area 252a2 and the busbar 253ds1 is connected along the second end.

The busbar 253ds2 is connected along the first end of the heating area 252a3 and the busbar 253ds3 is connected along the second end. The busbar 253ds4 is connected along the first end of the heating area 252a4 and the busbar 253ds3 is connected along the second end. The busbar 253ds4 is connected along the first end of the heating area 252a5 and the busbar 253d2 is connected along the second end.

The busbar 253ds1 is shared by the heating areas 252a1 and 252a2. Also, the busbar 253ds2 is shared by the heating areas 252a2 and 252a3. The busbar 253ds3 is also shared in the heating areas 252a3 and 252a4. The busbar 253ds4 is also shared in the heating areas 252a4 and 252a5. That is, the heating areas 252a1, 252a2, 252a3, 252a4, and 252a5 are connected in series via the busbars 253ds1, 253ds2, 253ds3, and 253ds4. The heating areas 252a1, 252a2, 252a3, 252a4, and 252a5 constitute the first heating zone A2.

When current is supplied to the first heating zone A2 of the heating element 252 from a power source such as a battery, via the busbar 253d1 and the busbar 253d2, the first heating zone A2 of the heating element 252 generates heat.

Heat generated in the first heating zone A2 warms the information transmitting/receiving area 26 of the windshield 20 and eliminates freezing and fogging of the surface of the glass plate 21 constituting the information transmitting/receiving area 26. This ensures good sensing by the device 300.

The positions of slits S1, S2, S3, and S4 can be defined such that the width (length in the Z direction) of the heating areas 252a1, 252a2, 252a3, 252a4, and 252a5 are the same. This reduces the variation in calorific value in the heating areas 252a1, 252a2, 252a3, 252a4, and 252a5.

Thus, in the second embodiment, the heating element 252 is divided into five heating areas 252a1, 252a2, 252a3, 252a4, and 252a5 by slits S1, S2, S3, and S4. The separated heating areas 252a1, 252a2, 252a3, 252a4, and 252a5 are then connected in series via the busbars 253ds1, 253ds2, 253ds3, and 253ds4. This achieves the same effect as the first embodiment.

Third Embodiment

A third embodiment shows an example in which the slit dividing the heating area is a curve. In the third embodiment, the description of the same configuration portion as that of the embodiment described previously may be omitted.

Figure 5:
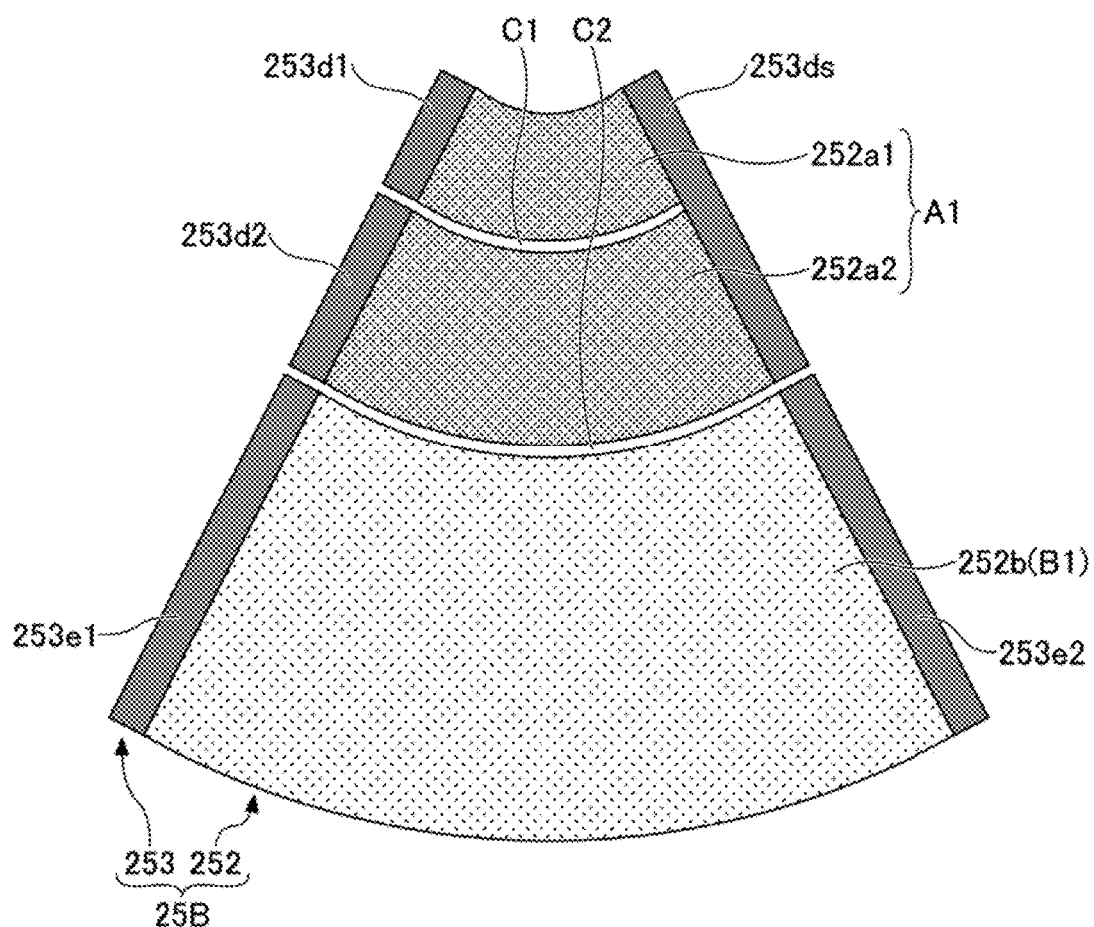
FIG. 5 is a diagram illustrating a film according to a third embodiment.

FIG. 5 is a schematic planar view illustrating a film according to a third embodiment, wherein the film is viewed from the inside to outside of the vehicle cabin. Since the cross-sectional view of the film is the same as that in FIG. 2B, the drawing is omitted.

The film 25B according to the third embodiment differs from the film 25 according to the first embodiment in that the linear slits S1 and S2 are replaced by curved slits C1 and C2 (circular arc). The upper end of the heating area 252a1 and the lower end of the heating area 252b are curved in the same direction as the slits C1 and C2.

As described above, the same effect as the first embodiment is achieved when the curved slits C1 and C2 (arc-shaped) are provided.

Further, when the slit is a linear slit, the linear slit may be falsely recognized as a horizontal line when the device 300 is a camera. In contrast, when the sift is a curved slit, the risk of false recognition of the linear slit as a horizontal line can be reduced when the device 300 is a camera.

A linear slit and a curved slit may be used in combination. That is, at least a portion of the slit may be curved so, a single slit may include both a linear portion and a curved portion. In these cases, the likelihood of false recognition of the slit as a horizontal line can be reduced when the device 300 is a camera.

Fourth Embodiment

The fourth embodiment shows an example in which a slit is provided in a vertical direction in a planar view. In the fourth embodiment, the description of the same configuration as the embodiment described above may be omitted.

Figure 6:
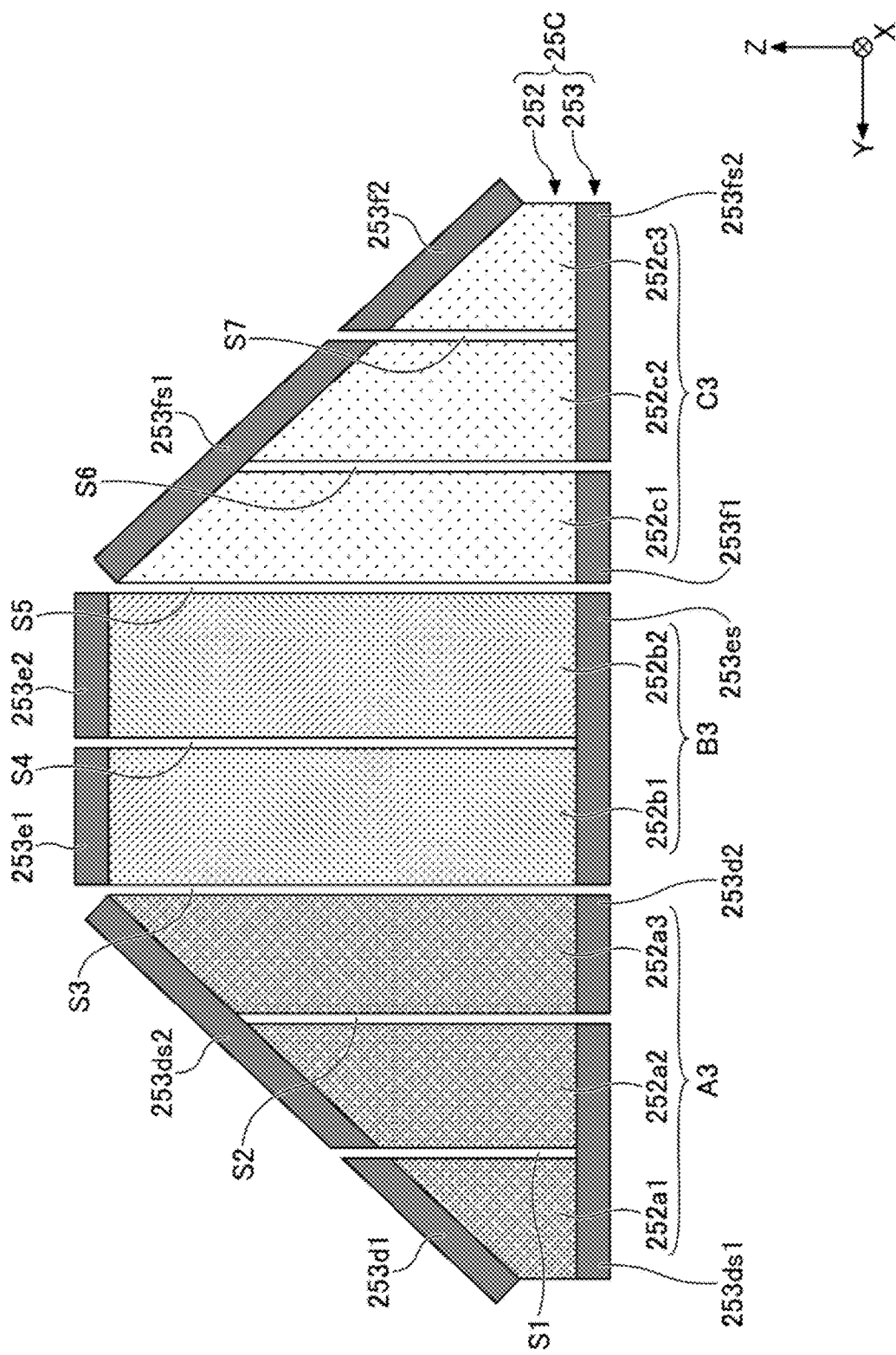
FIG. 6 is a diagram illustrating a film according to a fourth embodiment.

FIG. 6 is a schematic planar view illustrating a film according to a fourth embodiment in which the film is viewed from inside to outside of a vehicle cabin. Since the cross-sectional view of the film the same as that in FIG. 2B, the drawing is omitted.

In the film 25C according to the fourth embodiment, as an example, the heating element 252 is provided with seven slits S1, S2, S3, S4, S5, S6, and S7 extending in the Z direction (vertical direction with the windshield 20 attached to the vehicle) in a planar view. The heating element 252 is divided into eight heating areas 252a1, 252a2, 252a3, 252b1, 252b2, 252c1, 252c2, and 252c3 by slits S1, S2, S3, S5, S6, and S7.

At heating element 252, the busbar 253d1 is connected along the first end of heating area 252a1 and the busbar 253ds1 is connected along the second end. The busbar 253ds2 is connected along the first end of the heating area 252a2 and the busbar 253ds1 is connected along the second end. The busbar 253ds2 is connected along the first end of the heating area 252a3 and the busbar 253d2 is connected along the second end.

The busbar 253ds1 is shared by the heating areas 252a1 and 252a2. Also, the busbar 253ds2 is shared by the heating areas 252a2 and 252a3. That is, the heating areas 252a1, 252a2, and 252a3 are connected in series via the busbars 253ds1 and 253ds2. The heating areas 252a1, 252a2, and 252a3 constitute the first heating zone A3.

The busbar 253e1 is connected along the first end of the heating area 252b1 and the busbar 253es is connected along the second end. The busbar 253e2 is connected along the first end of the heating area 252b2 and the busbar 253es is connected along the second end.

The busbar 253es is shared in the heating areas 252b1 and 252b2. That is, the heating areas 252b1 and 252b2 are connected in series via the busbar 253es. The heating areas 252b1 and 252b2 constitute the second heating zone B3.

The busbar 253f1 is connected along the first end of the heating area 252c1 and the busbar 253fs1 is connected along the second end. The busbar 253fs2 is connected along the first end of the heating area 252c2 and the busbar 253fs1 is connected along the second end. The busbar 253fs2 is connected along the first end of the heating area 252c3 and the busbar 253f2 is connected along the second end.

The busbar 253fs1 is shared by the heating areas 252c1 and 252c2. The busbar 253fs2 is also shared by the heating areas 252c2 and 252c3. That is, the heating areas 252c1, 252c2, and 252c3 are connected in series via the busbars 253fs1 and 253fs2. The heating areas 252c1, 252c2, and 252c3 constitute the third heating zone C3.

The first heating zone A3, the second heating zone B3, and the third heating zone C3 are connected in parallel. That is, the voltage applied across the busbars 253d1 and 253d2, the voltage applied across the busbars 253e1 and 253e2, and the voltage applied across the busbars 253f1 and 253f2 are the same.

When current is supplied from a power source, such as a battery, via the busbar 253d1 and the busbar 253d2 to the first heating zone A3 of the heating element 252, the first heating zone A3 of the heating element 252 generates heat. Since the first heating zone A3, the second heating zone B3, and the third heating zone C3 are connected in parallel, the second heating zone B3 and the third heating zone C3 generate heat together with the first heating zone A3.

Heat generated in the first heating zone A3, the second heating zone B3, and the third heating zone C3 warms the information transmitting/receiving area 26 of the windshield 20 and eliminates freezing and fogging of the surface of the class plate 21 constituting the information transmitting/receiving area 26. This ensures good sensing by the device 300.

The positions of slits S1, S2, S3, S4, and S5 can be defined such that the sum of the average interpolar distances of each of the heating areas 252a1, 252a2, and 252a3 is equal to the sum of the average interpolar distances of the heating area 252b1 and the average interpolar distances of the heating area 252b2. The positions of slits S3, S4, S5, S6, and S7 can also be defined such that the sum of the average interpolar distances of heating area 252b1 and the average interpolar distances of heating area 252b2 equals the sum of the average interpolar distances of heating area 252c1, 252c2, and 252c3, respectively. This allows the first heating zone A3, the second heating zone B3, and the third heating zone C3 to generate the same amount of heat.

Thus, in the fourth embodiment, the heating element 252 is divided into eight heating areas 252a1, 252a2, 252a3, 252b1, 252b2, 252c1, 252c2, and 252c3 by slits S1 to S7. The divided heating areas 252a1, 252a2, and 252a3 share the busbars 253ds1 and 253ds2 and are connected in series. Also, the divided heating areas 252b1 and 252b2 share the busbars 253es and are connected in series. The divided heating areas 252c1, 252c2, and 252c3 also share the busbars 253fs1 and 253fs2 and are connected in series. This achieves the same effect as the first embodiment.

In the fourth embodiment, the heating element 252 is split with a slit parallel to the Z-axis. Accordingly, even when the information transmitting/receiving area 26 becomes horizontal because a plurality of devices is mounted in a vehicle, the interpolar distance can be prevented from being extremely long in each heating area.

The power supply direction by the busbar may be a left-right direction (a horizontal direction) as illustrated in FIGS. 4 and 5, or a vertical direction (a vertical direction) as illustrated in FIG. 6.

Fifth Embodiment

The fifth embodiment shows an example in which a slit is provided in an oblique direction in a planar view. In the fifth embodiment, the description of the same configuration as that of the embodiment described above may be omitted.

Figure 7:
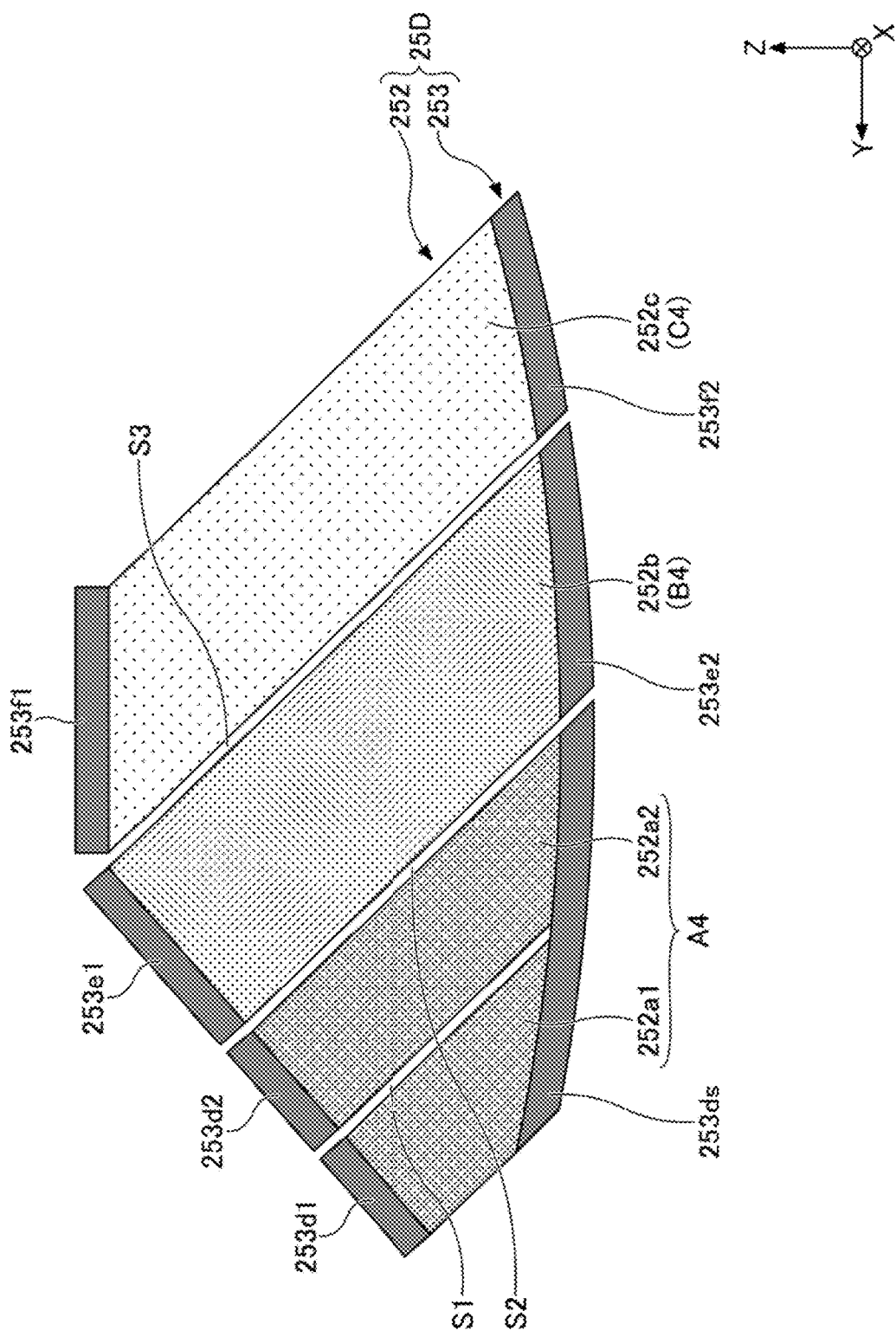
FIG. 7 is a diagram illustrating a film according to a fifth embodiment.

FIG. 7 is a diagram illustrating a film according to a fifth embodiment, and is a planar view schematically showing a view of the film viewed from inside to outside of a vehicle cabin. Since the cross-sectional view of the film is the same as that in FIG. 2B, the drawing is omitted.

In the film 25D according to the fifth embodiment, as an example, the heating element 252 is provided with three slits S1, S2, and S3 extending in the oblique direction (the direction intersecting the horizontal and vertical direction with the windshield 20 attached to the vehicle) in a planar view. The heating element 252 is divided into four heating areas 252a1, 252a2, 252b, and 252c by slits S1, S2, and S3.

At heating element 252, the linear busbar 253d1 is connected along the first end of heating area 252a1, and a curved busbar 253ds is connected along the second end. The linear busbar 253d2 is connected along the first end of the heating area 252a2 and the curved busbar 253ds is connected along the second end. The busbar 253ds is shared between heating areas 252a1 and 252a2. That is, the heating areas 252a1 and 252a2 are connected in series via the busbars 253ds. The first heating zone A4 is configured by the heating areas 252a1 and 252a2.

The linear busbar 253e1 is connected along the first end of the heating area 252b and the curved busbar 253e2 is connected along the second end. The second heating zone B4 is formed by the heating area 252b.

The linear busbar 253f1 is connected along the first end of the heating area 252c and the curved busbar 253f2 is connected along the second end. The third heating zone C4 is configured by the heating area 252c.

The first heating zone A4, the second heating zone B4, and the third heating zone C4 are connected in parallel. That is, the voltage applied across the busbars 253d1 and 253d2, the voltage applied across the busbars 253e1 and 253e2, and the voltage applied across the busbars 253f1 and 253f2 are the same.

When current is supplied from a power source, such as a battery, via the busbar 253d1 and the busbar 253d2 to the first heating zone A4 of the heating element 252, the first heating zone A4 of the heating element 252 generates heat. Since the first heating zone A4, the second heating zone B4, and the third heating zone C4 are connected in parallel, the second heating zone B4 and the third heating zone C4 generate heat together with the first heating zone A4.

Heat generated in the first heating zone A4, the second heating zone B4, and the third heating zone C4 warms the information transmitting/receiving area 26 of the windshield 20 and eliminates freezing and fogging of the surface of the glass plate 21 constituting the information transmitting/receiving area 26. This ensures good sensing by the device 300.

The positions of slits S1, S2, and S3 can be defined such that the average interpolar distance of heating area 252b, the average interpolar distance of heating area 252c, and the sum of the average interpolar distance of heating area 252a1 and the average interpolar distance of heating area 252a2 are to be equal. Thereby, the same amount of heat can be generated in the first heating zone A4, the second heating zone B4, and the third heating zone C4.

Thus, in the fifth embodiment, the heating element 252 is divided into four heating areas 252a1, 252a2, 252b, and 252c by slits S1, S2, and S3. The divided heating areas 252a1 and 252a2 share the busbar 253ds and are connected in series. This achieves the same effect as the first embodiment.

The power supply direction by the busbar may be a left-right direction (a horizontal direction) as illustrated in FIGS. 4 and 5, a vertical direction (a vertical direction) as illustrated in FIG. 6, or the busbar may be disposed in an oblique direction or in an asymmetric shape as illustrated in FIG. 7 depending on the planar shape of the information transmitting/receiving area 26. Alternatively, the busbars may be linear or curved, and a combination of linear and curved busbars may be used.

Sixth Embodiment

The sixth embodiment shows an example of laminated glass with a film. In the sixth embodiment, the description of the same configuration portion as that of the embodiment described previously may be omitted.

Figure 8:
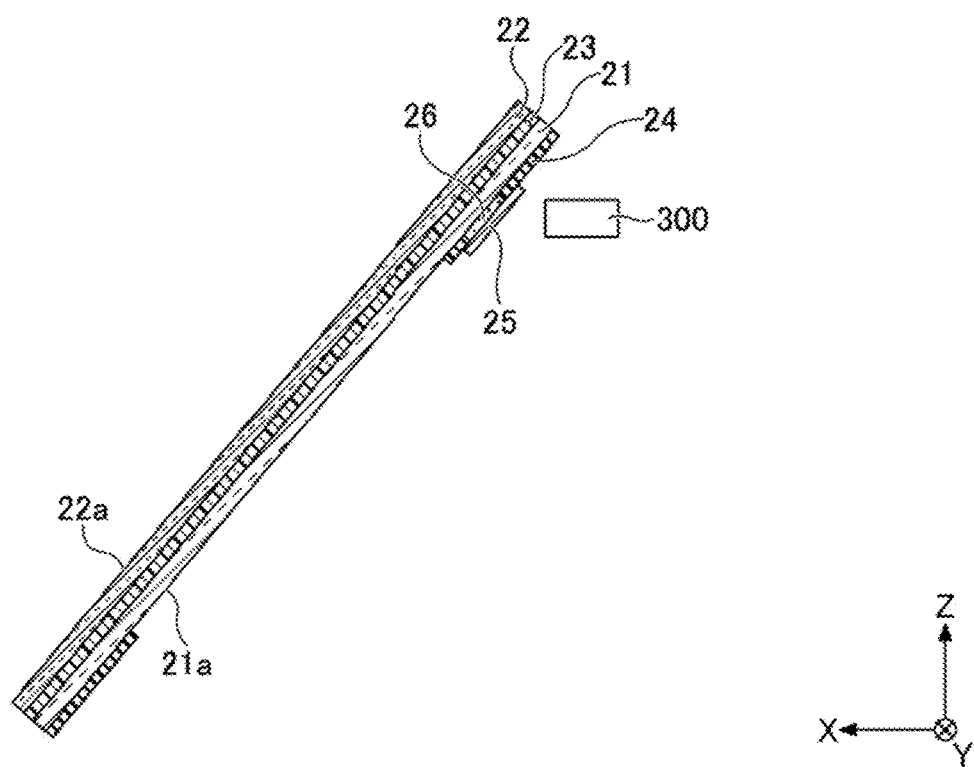
FIG. 8 is a cross-sectional view illustrating a windshield for a vehicle according to a sixth embodiment.

FIG. 8 is a cross-sectional view illustrating a windshield for a vehicle according to the sixth embodiment. Since the planar view of the windshield is the same as that in FIG. 1A, the drawing is omitted. Although FIG. 8 illustrates the device 300 with a windshield 20A for convenience, the device 300 is not a component of the windshield 20A.

As shown in FIG. 8, the windshield 20A is laminated glass, for a vehicle, having a glass plate 21 as the inner glass plate of a vehicle, a glass plate 22 as the outer glass plate of a vehicle, an intermediate film 23, a shielding layer 24, and a film 25.

In the windshield 20A, the glass plate 21 and the glass plate 22 are clamped together and have interposed therebetween the intermediate film 23. The intermediate film 23 may be formed from multiple layers of the intermediate film.

The shielding layer 24 is provided at the periphery of vehicle-interior side surface 21a of the glass plate 21. The shielding layer 24 may be provided on the periphery of the vehicle-interior side surface of the glass plate 22 or on both the periphery of the vehicle-interior side surface 21a of the glass plate 21 and the periphery of the vehicle-interior side surface of the glass plate 22. Similar to the windshield 20, the film 25 is attached to an area of the glass plate 21, the area being outside of the test area A (see FIG. 1A) and overlapping the information transmitting/receiving area 26 in a planar view.

In the windshield 20A, the vehicle-interior side surface 21a of the glass plate 21 (the inner surface of the windshield 20A) and the vehicle-exterior side surface 22a of the glass plate 22 (the outer surface of the windshield 20A) may be flat or curved surfaces.

For example, inorganic glass such as soda lime glass, aluminosilicate, organic glass and the like may be used as the glass plates 21 and 22. When the glass plates 21 and 22 are inorganic glass, they can be produced, for example, by a float process.

The thickness of the glass plate 22 located outside the windshield 20A is preferably 1.8 mm or more and 3 mm or less in the thinnest portion of the glass plate. When the thickness of the glass plate 22 is 1.8 mm or more, the strength of the resistance to windshield chipping and cracking or the like is sufficient. When the thickness is 3 mm or less, the mass of the laminated glass is not too large, and it is preferable in terms of the fuel economy of the vehicle. The thickness of the glass plate 22 is more preferably 1.8 mm or more and 2.8 mm or less, and further preferably 1.8 mm or more and 2.6 mm or less.

The thickness of the glass plate 21 located inside the windshield 20A is preferably 0.3 mm or more and 2.3 mm or less. When the thickness of the glass plate 21 is 0.3 mm or more, the glass plate 21 is easy to handle. When the thickness is 2.3 mm or less, the mass of the windshield 20A is not too large.

When the thickness of the glass plate 21 is 0.3 mm or more and 2.3 mm or less, the glass quality (for example, residual stress) can be maintained. A plate thickness of 0.3 mm or more and 2.3 mm or less of the glass plate 21 is particularly effective for maintaining glass quality (e.g., residual stress) in deeply curved glass. The thickness of the glass plate 21 is more preferably 0.5 mm or more and 2.1 mm or less, and further preferably 0.7 mm or more and 1.9 mm or less.

However, the thickness of the glass plates 21 and 22 is not always constant and may vary from place to place as necessary. For example, one or both of the glass plates 21 and 22 may include a wedge-like area with a thicker vertical top thickness than the bottom when the windshield 20A is mounted to the vehicle.

When the windshield 20A is curved, then the glass plates 21 and 22 are bent and molded, such as by a float process, prior to adhesion by the intermediate film 23. Bending is accomplished by softening the glass by heating. The temperature at which the glass is heated during bending and molding is approximately 550° C. to 700° C.

Thermoplastic resins are frequently used as the intermediate film 23 for bonding the glass plate 21 to the glass plate 22. For example, thermoplastic resins which have been used for such applications as plasticized polyvinyl acetal resins, plasticized polyvinyl chloride resins, saturated polyester-based resins, plasticized saturated polyester-based resins, polyurethane-based resins, plasticized polyurethane-based resins, ethylene-vinyl acetate copolymer-based resins, ethylene-ethyl acrylate copolymer-based resins and the like. Resin compositions containing modified block copolymer hydrides as described in Japanese Patent No. 6065221 can also be suitably employed.

Among these, plasticized polyvinyl acetal resin is preferably used because it has excellent balance of various performance properties such as transparency, weather resistance, strength, adhesion, penetration resistance, shock energy absorption, moisture resistance, thermal insulation, sound insulation, and the like. These thermoplastics may be used alone or in combination with two or more types. "Plasticization" in the above-described plasticized polyvinyl acetal resin refers plasticized by the addition of a plasticizer. The same applies to other plasticized resins.

The above-described polyvinyl acetal-based resin includes a polyvinyl formal resin obtained by reacting a polyvinyl alcohol (hereinafter, sometimes referred to as "PVA" as necessary) with formaldehyde, a narrowly defined polyvinyl acetal resin obtained by reacting a PVA with acetaldehyde, and a polyvinyl butyral resin obtained by reacting a PVA with n-butyraldehyde (hereinafter, sometimes referred to as "PVB" as necessary). In articular, the PVB is considered to be suitable because it has excellent balance of various performance characteristics such as transparency, weather resistance, strength, adhesion, permeability, impact energy absorption, moisture resistance, heat insulation, sound insulation and the like. These polyvinyl acetal resins may be used alone or two or more types of these polyvinyl acetal resins may be used together. However, the material forming the intermediate film 23 is not limited to the thermoplastic resin. The thickness of the intermediate film 23 is preferably 0.5 mm or more in the thinnest portion of the glass plate. When the thickness of the intermediate film 23 is 0.5 mm or more, the necessary penetration resistance as a windshield is sufficient. In addition, it is preferable that the thickness of the intermediate film 23 is 3 mm or less at the thickest portion. If the maximum thickness of the intermediate film 23 is 3 mm or less, the mass of the laminated glass does not increase too much. The maximum value of the intermediate film 23 is more preferably 2.8 mm or less, and further preferably 2.6 mm or less.

The intermediate film 23 may have three or more layers. For example, the intermediate film is constituted by three layers, and the hardness of the middle layer is lowered below the hardness of the other two avers adjusting the plasticizer, etc., thereby improving the sound insulation performance of the laminated glass. In this case, the hardness of the other two layers may be the same or different.

In order to fabricate the intermediate film 23, for example, the above-described resin material that is the intermediate film is appropriately selected. The intermediate film is extruded and molded in a heated melt state using an extruder. Then, the extrusion conditions such as extrusion speed of the extruder is set to be uniform. Thereafter, the intermediate film 23 is completed by extending the extruded resin film, for example, as needed, in order to provide curvature to the upper and lower sides of the windshield 20A in accordance with the design of the windshield 20A.

The intermediate film 23 is sandwiched between the glass plate 21 and the glass plate 22 to produce a laminated glass. The laminate is placed into a rubber bag, for example, and bonded at a temperature of about 70 to 110° C. in a vacuum of −100 to −65 kPa.

Further, the durability of the laminate of the glass plate 21, the intermediate film 23, and the glass plate 22 can be further improved by performing a compression bonding of heating and pressing at, for example, 100 to 150° C., a pressure of 0.6 to 1.3 MPa. However, this heating and pressurizing process may not be used in some cases, taking into consideration of the simplification of the process and the properties of the materials encapsulated in laminated glass.

After the laminate of the glass plate 21, the intermediate film 23, and the glass plate 22 is completed, for example, printing ink is applied to the vehicle-interior side surface 21a of the glass plate 21 and burned to form the shielding layer 24. Then, the windshield 20A is completed by attaching the film 25 via the adhesive layer 29 to an area outside the test area A and overlapping the information transmitting/receiving area 26 in a planar view.

In addition to the intermediate film 23, a film or device having functions such as infrared reflection, luminescence, dimming, visible light reflection, scattering, decoration, absorption or the like may be provided between the glass plate 21 and the glass plate 22, to the extent that the effect of the present invention is not impaired.

In the case where the shielding layer 24 is provided on the inner surface of the glass plate 22, it is preferable that the edge of the shielding layer 24 overlap the edge of the film 25 by 1 mm or more in a planar view from the viewpoint of reducing the concealment and the fluoroscopic distortion of the edge. Also, a layer may be provided on the film 25 itself to conceal the edges of the film 25 (e.g., coloring the periphery of the film 25).

Thus, the windshield to which the film 25 is applied may be a laminated glass, such as the windshield 20A.

Seventh Embodiment

The seventh embodiment shows an example of providing a heating element that is different from the first embodiment. In the seventh embodiment, the description of the same configuration portion as that of the embodiment described previously may be omitted.

Figure 9:
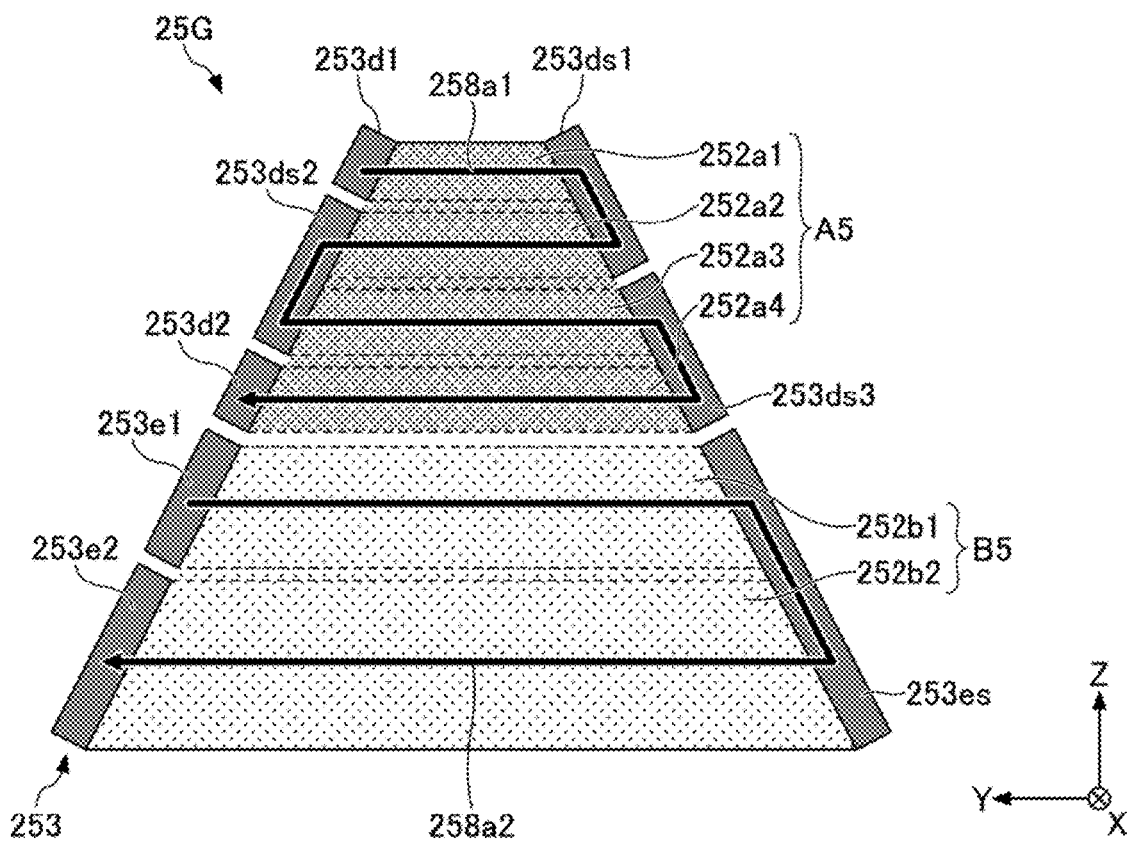
FIG. 9 is a planar view illustrating a film according to a seventh embodiment.

FIG. 9 is a planar view illustrating a film according to the seventh embodiment and schematically shows a view of the film viewed from inside to outside of the vehicle cabin.

The film 25G according to the seventh embodiment differs from the film 25 (see FIGS. 2A and 2B, etc.) in that the heating element 252 has been replaced by the heating elements 258a1 and 258a2. In film 25G, configurations other than heating elements such as substrate 251 and the like are similar to the first embodiment.

The heating elements 258a1 and 258a2 are electric heat wires. The heating elements 258a1 and 258a2 are shown as a single wire, but in practice, an arrangement in which a plurality of electric heat wires is arranged in a predetermined interval is provided.

As described above, the material of the metal of the electric heat wire constituting the heating elements 258a1 and 258a2 is not particularly limited as long as the material of the metal is a conductive material. Examples of the material include (i) at least one metal selected from the group consisting of gold, silver, copper, aluminum, nickel and tungsten, (ii) an alloy containing two or more metals selected from the group, and the like.

The film 25G has a first heating zone A5 on the substrate 251 provided with a heating element 258a1 and a second heating zone B5 on the substrate 251 provided with a heating element 258a2. The first heating zone A5 and the second heating zone B5 are connected in parallel.

The first heating zone A5 is divided into heating areas 252a1, 252a2, 252a3, and 252a4 due to the different specifications of the heating element 258a1, which is an electric heat wire. Here, the difference in specifications is the difference in the width, pitch, thickness, wire type, material, and the like of the electric heat wire.

In the first heating zone A5, the busbar 253d1 is connected along the first end of the heating area 252a1 and the busbar 253ds1 is connected along the second end. The busbar 253ds2 is connected along the first end of the heating area 252a2 and the busbar 253ds1 is connected along the second end.

The busbar 253ds2 is connected along the first end of the heating area 252a3 and the busbar 253ds3 is connected along the second end. The busbar 253d2 is connected along the first end of the heating area 252a4 and the busbar 253ds3 is connected along the second end.

The busbar 253ds1 is shared by the heating areas 252a1 and 252a2. Also, the busbar 253ds2 is shared by heating areas 252a2 and 252a3. The busbar 253ds3 is also shared in the heating areas 252a3 and 252a4. That is, the heating elements 258a1 arranged in the heating areas 252a1, 252a2, 252a3, and 252a4 are connected in series between the busbars 253d1 and 253d2 via the busbars 253ds1, 253ds2, and 253ds3.

When current is supplied to the heating element 258a1 from a power source, such as a battery, via the busbar 253d1 and the busbar 253d2, the first heating zone A5 generates heat.

The second heating zone B5 is divided into the heating areas 252b1 and 252b2 due to the difference in specifications of the heating element 258a2, which is an electric heat wire.

In the second heating zone B5, the busbar 253e1 is connected along the first end of the heating area 252b1 and the busbar 253es is connected along the second end. The busbar 253e2 is connected along the first end of the heating area 252b2 and the busbar 253es is connected along the second end.

The busbar 253es is shared in the heating areas 252b1 and 252b2. That is, the heating element 258a2 arranged in the heating areas 252b1 and 252b2 is connected in series between the busbar 253e1 and the busbar 253e2 via the busbar 253es.

When current is supplied to the heating element 258a2 from a power source, such as a battery, via the busbar 253e1 and the busbar 253e2, the second heating zone B5 is heated.

Heat generated in the first heating zone A5 and the second heating zone B5 warms the information transmitting/receiving area 26 of the windshield to eliminate freezing and fogging of the surface of the glass plate 21 constituting the information transmitting/receiving area 26. This ensures good sensing by the device 300.

As described above, by dividing each heating zone into a plurality of heating areas due to a difference in the specifications of the heating element that is an electric heat wire, the change in the interpolar distance of the busbars within each heating area can be minimized, thereby preventing the generation of the heat generation distribution within the heating area. As a result, a windshield in which the sensing performance of the device 300 is not easily impaired due to freezing, fogging, or the like can be achieved.

It is not necessary that the width of the electric heat wire constituting the heating element 258a1 is constant in the heating area of each of the first heating zones A5, and the width of the electric heat wire may be different in the heating area of each of the first heating zones A5. Similarly, in each heating area of the second heating zone B5, the width of the electric heat wires constituting the heating element 258a2 need not be constant, and the width of the electric heat wires in each heating area of the second heating zone B5 may be different.

In the heating area of the first heating zone A5 and the second heating zone B5, in a case where pitch of the electric heat wires is constant, it is preferable that the width of the electric wire is narrowest on the side closest to the upper side of the information transmitting/receiving area 26 and narrows as the wire approaches the lower side of the information transmitting/receiving area 26 when the windshield is mounted to the vehicle.

Specifically, for example, assuming that the electric heat wires have widths of W1, W2, W3, and W4 extending in order from the upper side to the lower side of the information transmitting/receiving area 26 when the windshield is mounted to the vehicle, it is preferable that width W1<W2<W3<W4.

In this way, the generation of the heat generation distribution in the heating area can be further suppressed. In addition, the generation of the heat generation distribution between the heating zones can be suppressed. In the film 25G, the number of heating zones or the number of heating areas can be freely set. For example, the number of heating zones and the number of heating areas may be adjusted in view of the pitch of electric heat wire and the width of wire constraints defined in view of the effect on the device 300.

Eighth Embodiment

The eighth embodiment shows an example of providing a heating element that is different from the first embodiment.

In the eighth embodiment, the description of the same configuration as that of the embodiment described above may be omitted.

Figure 10:
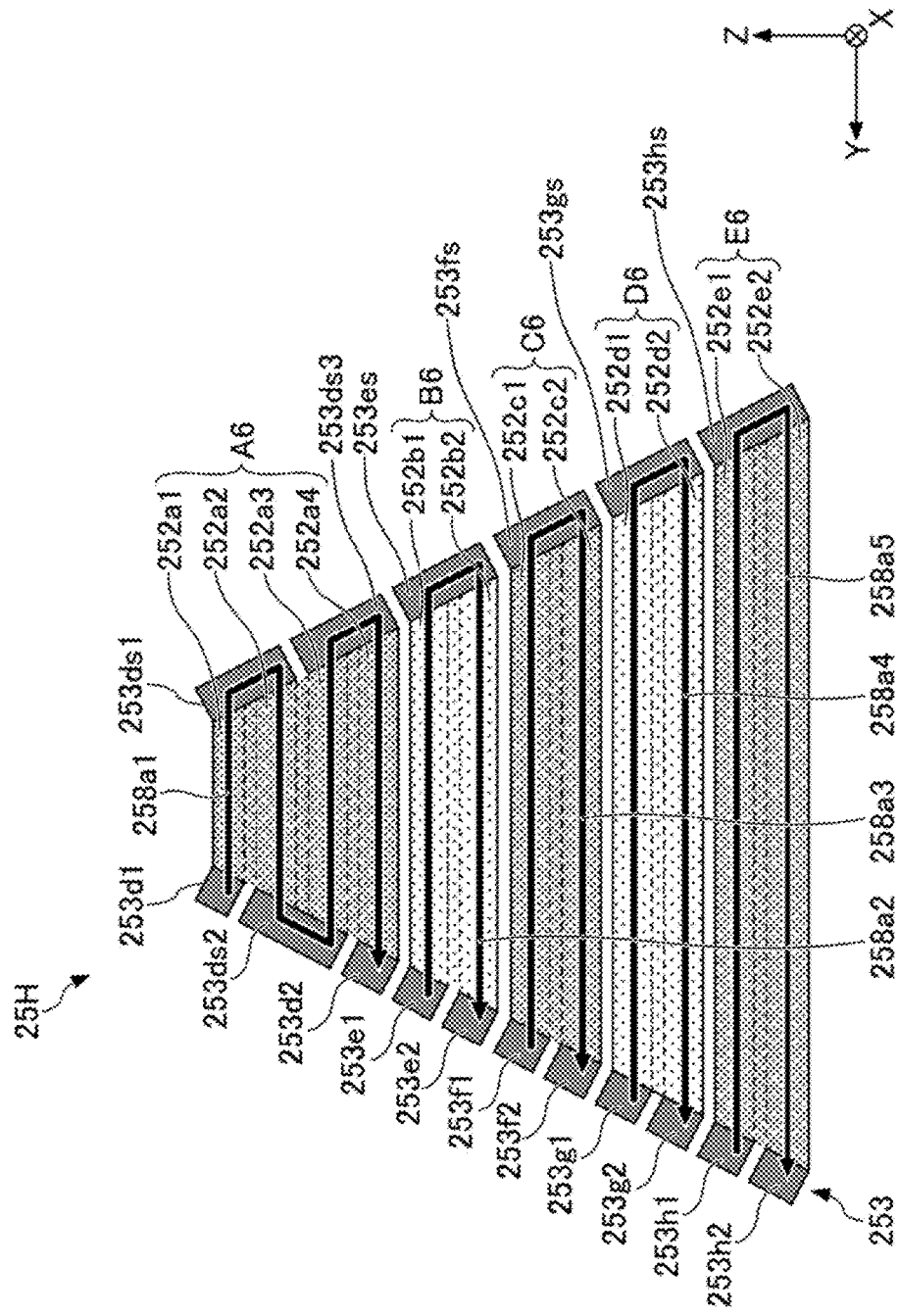
FIG. 10 is a planar view illustrating a film according to an eighth embodiment.

FIG. 10 is a planar view illustrating a film according to an eighth embodiment and schematically shows a view of the film viewed from inside to outside of the vehicle cabin.

The film 25H according to the eighth embodiment differs from the film 25 (see FIGS. 2A and 2B, etc.) in that heating element 252 has been replaced by heating element 258a1, 258a2, 258a3, 258a4 and 258a5. In the film 25H, configurations other than heating elements such as the substrate 251 are similar to the first embodiment.

Heating elements 258a1, 258a2, 258a3, 258a4 and 258a5 are electric heat wires. The heating elements 258a1, 258a2, 258a3, 258a4 and 258a5 are illustrated as a single line, but in practice, an arrangement in which a plurality of electric heat wires is placed at predetermined intervals is provided.

The heating elements 258a1, 258a2, 258a3, 258a4 and 258a5 are similar to the material of the electric heat wire metal in the seventh embodiment.

The film 25H includes a first heating zone A6 on the substrate 251 in which the heating element 258a1 is provided, a second heating zone B6 in which the heating element 258a2 is provided on the substrate 251, a third heating zone C6 in which the heating element 258a3 is provided on the substrate 251, a fourth heating zone D6 in which the heating element 258a4 is provided on the substrate 251, and a fifth heating zone E6 in which the heating element 258a5 is provided on the substrate 251. The first heating zone A6, the second heating zone B6, the third heating zone C6, the fourth heating zone D6, and the fifth heating zone E6 are connected in parallel.

The first heating zone A6 is divided into heating areas 252a1, 252a2, 252a3 and 252a4 due to differences in the specifications of the heating element 258a1, which is an electric heat wire.

In the first heating zone A6, the busbar 253d1 is connected along the first end of the heating area 252a1 and the busbar 253ds1 is connected along the second end. The busbar 253ds2 is connected along the first end of the heating area 252a2 and the busbar 253ds1 is connected along the second end.

The busbar 253ds2 is connected along the first end of the heating area 252a3 and the busbar 253ds3 is connected along the second end. The busbar 253d2 is connected along the first end of the heating area 252a4 and the busbar 253ds3 is connected along the second end.

The busbar 253ds1 is shared by the heating areas 252a1 and 252a2. Also, the busbar 253ds2 is shared by heating areas 252a2 and 252a3. The busbar 253ds3 is also shared in the heating areas 252a3 and 252a4. That is, the heating element 258a1 arranged in the heating areas 252a1, 252a2, 252a3 and 252a4 is connected in series between the busbars 253d1 and 253d2 via the busbars 253ds1, 253ds2 and 253ds3.

When a current is supplied to the heating element 258a1 from a power source, such as a battery, via the busbar 253d1 and the busbar 253d2, the first heating zone A6 generates heat.

The second heating zone B6 is divided into the heating areas 252b1 and 252b2 due to the difference in specifications of the heating element 258a2, which an electric heat wire.

In the second heating zone B6, the busbar 253e1 is connected along the first end of the heating area 252b1 and the busbar 253es is connected along the second end. The busbar 253e2 is connected along the first end of the heating area 252b2 and the busbar 253es is connected along the second end.

The busbar 253es is shared in the heating areas 252b1 and 252b2. That is, the heating element 258a2 arranged in the heating areas 252b1 and 252b2 is connected in series between the busbar 253e1 and the busbar 253e2 via the busbar 253es.

When a current is supplied to the heating element 258a2 from a power source, such as a battery, via the busbar 253e1 and the busbar 253e2, the second heating zone B6 generates heat.

The third heating zone C6 is divided into heating areas 252c1 and 252c2 due to the difference in specifications of the heating element 258a3, which is an electric heat wire.

In the third heating zone C6, the busbar 253f1 is connected along the first end of the heating area 252c1 and the busbar 253fs is connected along the second end. The busbar 253f2 is connected along the first end of the heating area 252c2 and the busbar 253fs is connected along the second end.

The busbar 253fs is shared in heating areas 252c1 and 252c2. That is, the heating element 258a3 arranged in the heating areas 252c1 and 252c2 is connected in series between the busbar 253f1 and the busbar 253f2 via the busbar 253fs.

When a current is supplied to the heating element 258a3 from a power source, such as a battery, via the busbar 253f1 and the busbar 253f2, the third heating zone C6 generates heat.

The fourth heating zone D6 is divided into the heating areas 252d1 and 252d2 due to the difference in specifications of the heating element 258a4, which is an electric heat wire.

In the fourth heating zone D6, the busbar 253g1 is connected along the first end of the heating area 252d1, and the busbar 253gs is connected along the second end. The busbar 253g2 is connected along the first end of the heating area 252d2 and the busbar 253gs is connected along the second end.

The busbar 253gs is shared in the heating areas 252d1 and 252d2. That is, the heating element 258a4 arranged in the heating areas 252d1 and 252d2 is connected in series between the busbar 253g1 and the busbar 253g2 via the busbar 253gs.

When a current is supplied to the heating element 258a4 from a power source, such as a battery, via the busbar 253g1 and the busbar 253g2, the fourth heating zone D6 generates heat.

The fifth heating zone E6 is divided into the heating areas 252e1 and 252e2 due to the difference in specifications of the heating element 258a5, which is an electric heat wire.

In the fifth heating zone E6, the busbar 253h1 is connected along the first end of the heating area 252e1 and the busbar 253hs is connected along the second end. The busbar 253h2 is connected along the first end of the heating area 252e2 and the busbar 253hs is connected along the second end.

The busbar 253hs is shared by the heating areas 252e1 and 252e2. That is, the heating element 258a5 arranged in the heating areas 252e1 and 252e2 is connected in series between the busbars 253h1 and 253h2 via the busbars 253hs.

When a current is supplied to the heating element 258a5 from a power source, such as a battery, via the busbar 253h1 and the busbar 253h2, the fifth heating zone E6 generates heat.

Heat generated in the first heating zone A6, the second heating zone B6, the third heating zone C6, the fourth heating zone D6, and the fifth heating zone E6 warms the information transmitting/receiving area 26 of the windshield and eliminates freezing and fogging of the surface of the glass plate 21 constituting the information transmitting/receiving area 26. This ensures good sensing by the device 300.

As described above, by dividing each heating zone into a plurality of heating areas due to a difference in the specification of the heating element that is an electric heat wire, the change in the interpolar distance of the busbars within each heating areas can be minimized, thereby preventing the generation of the heat generation distribution within the heating area. In addition, the generation of the heat generation distribution between the heating zones can be suppressed. As a result, a windshield in which the sensing performance of the device 300 is not easily impaired due to freezing, fogging or the like can be achieved.

In addition, in the first heating zone A6, the second heating zone B6, the third heating zone C6, the fourth heating zone D6, and the fifth heating zone E6, the pitch of the electric heat wire constituting the heating element does not need to be constant, and the pitch of the electric heat wire may differ in each heating zone.

If the wire diameter of each heating zone is constant and the width of each heating zone is constant, in the pitch of each heating zone, the pitch of the electric heat wire is preferably narrow as the interpolar distance of the busbars in each heating zone increases.

Specifically, it is preferable that when the windshield is mounted to a vehicle, when the interpolar distance of the busbar in the first heating zone A6 closest to the upper side of the information transmitting/receiving area 26 is Hz1, the pitch of the electric heat wire is Pz1, the interpolar distance of the busbar in the second heating zone B6 is Hz2, the pitch of the electric heat wire is Pz2, the interpolar distance of the busbar in the third heating zone C6 is Hz3, the pitch of the electric heat wire is Pz3, the interpolar distance of the busbar in the fourth heating zone D6 is Hz4, the pitch of the electric heat wire is Pz4, the interpolar distance of the busbar in the fifth heating zone E6 is Hz5, and the pitch of the electric heat wire is Pz5, the relationship of the pitch of the electric heat wire satisfy Pz1>Pz2>Pz3>Pz4>Pz5 when the relationship of the interpolar distance of the busbar satisfy Hz1<Hz2<Hz3<Hz4<Hz5.

In this way, the generation of the heat generation distribution between the heating zones can be further suppressed. In addition, in the film 25H, the number of heating zones or the number of heating areas can be freely set. For example, the number of heating zones and the number of heating areas can be adjusted in consideration of restrictions on the pitch and width of the electric heat wire, which are determined in consideration of the influence on the device 300.

EXAMPLES

Example 1

In Example 1, the windshield 20 with the film 25 shown in FIGS. 2A and 2B were prepared. The planar shape of the film 25 was an isosceles trapezod having an upper base of 20 mm, a lower base of 90 mm, and a height of 80 mm.

In the film 25, the positions of slits S1 and S2 were defined such that the sum of the average interpolar distance of the heating area 252a1 and the average interpolar distance of the heating area 252a2 equaled the average polarity distance of the heating area 252b. Specifically, in the heating area 252a1, the minimum interpolar distance $l_1$ was 20 mm and the maximum interpolar distance $l_2$ was 35.1 mm. Further, in the heating area 252a2, the minimum interpolar distance $l_1$ was 35.1 mm and the maximum interpolar distance $l_2$ was 50.2 mm. Further, in the heating area 252b, the minimum interpolar distance $l_1$ was 50.2 mm and the maximum interpolar distance $l_2$ was 90 mm.

At this time, the width of the heating area 252a1 and the heating area 252a2 (the height of the isosceles trapezoid) was 17.2 mm each, and the width of the heating area 252b (the height of the isosceles trapezoid) was 45.6 mm.

Example 2

In Example 2, the windshield 20 with the film 25A shown in FIG. 4 was prepared. Similar to Example 1, the planar shape of the film 25A was an isosceles trapezoid with an upper base of 20 mm, a lower base of 90 mm, and a height of 80 mm.

In the film 25A, the positions of slits S1, S2, S3, and S4 were defined so that the widths (heights of the isosceles trapezoid) of heating areas 252a1, 252a2, 252a3, 252a4, and 252a5 were identical. Specifically, the width of the heating areas 252a1, 252a2, 252a3, 252a4, and 252a5 (heights of the isosceles trapezoid) was 16 mm each.

In this case, the minimum interpolar distance $l_2$ of the heating area 252a1 was 20 mm and the maximum interpolar distance $l_2$ is 34 mm. The minimum interpolar distance $l_1$ of the heating area 252a2 was 34 mm and the maximum interpolar distance $l_2$ is 48 mm. The minimum interpolar distance $l_1$ of the heating area 252a3 was 48 mm and the maximum interpolar distance $l_2$ was 62 mm. The minimum interpolar distance $l_2$ of the heating area 252a4 was 62 mm and the maximum interpolar distance $l_2$ was 76 mm. The minimum interpolar distance $l_1$ of the heating area 252a5 was 76 mm and the maximum interpolar distance $l_2$ was 90 mm.

Comparative Example 1

As a comparative example 1, the windshield 20 with the film 25X shown in FIG. 3A was prepared. Similar to Examples 1 and 2, the planar shape of the film 25X was an isosceles trapezoid with an upper base of 20 mm, a lower base of 90 mm, and a height of 80 mm. However, the film 25X had no slit, so there is only one heating area. Thus, the minimum interpolar distance $l_1$ and the maximum interpolar distance $l_2$ of the heating area were 20 mm and 90 mm, respectively.

[Evaluation]

When the minimum interpolar distance $l_2$ and the maximum interpolar distance $l_2$ are used, the ratio $P_1:P_2$ of the calorific value between the maximum calorific value point and the minimum calorific value point in each heating area was equal to $l_2^2$ (the square of the maximum interpolar distance): $l_1^2$ (the square of the minimum interpolar distance). Therefore, in Comparative Example 1, Example 1 and Example 2, $l_2^2/l_1^2$ in each heating area was calculated as an index for evaluating the distribution of heat generation, and the results were summarized in Table 1.

TABLE 1

|  | Heating area | Minimum interpolar distance $I_1$ [mm] | Maximum interpolar distance $I_2$ [mm] | $I_2^2/I_1^2$ |
|---|---|---|---|---|
| Comparative Example 1 | — | 20 | 90 | 20.3 |
| Example 1 | 252a1 | 20 | 35.1 | 3.1 |
|  | 252a2 | 35.1 | 50.2 | 2 |
|  | 252b | 50.2 | 90 | 3.2 |
| Example 2 | 252a1 | 20 | 34 | 2.9 |
|  | 252a2 | 34 | 48 | 2 |
|  | 252a3 | 48 | 62 | 1.7 |
|  | 252a4 | 62 | 76 | 1.5 |
|  | 252a5 | 76 | 90 | 1.4 |

As shown in Table 1, in Comparative Example 1, $I_2^2/I_1^2$ was 20.3. In other words, in the case of Comparative Example 1 in which there is one heating area, the ratio between the maximum calorific value point and the minimum calorific value point reached 20.3 times.

In contrast, in Example 1, where the slit is used to create three heating areas, $I_2^2/I_1^2$ was 3.2 for the largest heating area 252b. In other words, in the case of Example 1, the ratio of the maximum calorific value point to the minimum calorific value point was at most 3.2 times, and the ratio of the maximum calorific value point to the minimum calorific value point was significantly reduced compared to the case of Comparative Example 1 (20.3 times) in which no slit was provided.

Also, in Example 2, where the slit is provided to provide five heating areas, $I_2^2/I_1^2$ was 2.9 for the largest heating area 252a1. That is, in the case of Example 2, the ratio of the maximum calorific value point to the minimum calorific value point was at most 2.9 times, and as in the case of Example 1, the ratio of the maximum calorific value point to the minimum calorific value point was significantly reduced in comparison with Comparative Example 1 (20.3 times) in which no slit was provided.

As described above, in Comparative Example 1 in which no slit was provided, the interpolar distance of the busbars vary greatly in the heating area, so that the distribution of heat generation was large in accordance with the interpolar distance. By contrast, as in Example 1 and Example 2, it was confirmed that the generation of the heat generation distribution in the heating area can be suppressed because the change in the interpolar distance of the busbars in each heating area can be minimized by providing the slit to form a plurality of heating areas.

Although the preferred embodiment has been described in detail above, various modifications and substitutions can be made to the above-described embodiment without departing from the scope of the claims.

DESCRIPTION OF THE REFERENCE NUMERALS 20, 20A Windshield
21, 22 Glass plate
23 Intermediate film
24 Shielding layer
25, 25A, 25B, 25C, 25D, 25G, 25H Film
26 Information transmitting/receiving area
29 Adhesive layer
251 Substrate
252, 258a1, 258a2, 258a3, 258a4, 258a5 heating element
253 Busbar
254 Protective film
300 Device

The invention claimed is:

1. Glass for vehicles comprising:
a glass plate;
an information transmitting/receiving area, defined in the glass, via which a device mounted in a vehicle transmits or receives information; and
a film that heats the information transmitting/receiving area, the film being attached to an area overlapping the information transmitting/receiving area in an interior side of the glass plate in a vehicle in a planar view;
wherein the film includes a substrate, a heating element formed on the substrate, and a busbar connected to the heating element;
the film has a heating zone divided into two or more heating areas; and
the two or more of the heating areas share at least one busbar and are connected in series.

2. The glass according to claim 1 comprising,
a test area A specified by JIS Standard 83212, the test area A being defined in the glass,
wherein the film is applied to an area on the interior side of the glass plate, the area being outside the test area A and overlapping the information transmitting/receiving area in a planar view.

3. The glass according to claim 1 comprising,
the heating zone includes a first heating zone having heating areas connected in series and a second heating zone having heating areas different from the heating areas connected in series,
wherein the first heating zone and the second heating zone are connected in parallel.

4. The glass according to claim 1, wherein a ratio of a square of maximum interpolar distance of the busbar to a square of minimum interpolar distance is 1.2 or more.

5. The glass according to claim 1, wherein the heating zone is divided into the two or more heating areas by at least one slit.

6. The glass according to claim 5, wherein at least a portion of the slit is curved.

7. The glass according to claim 5, wherein a width of the slit is 0.3 mm or less.

8. The glass according to claim 5, wherein the glass has two or more slits, and a spacing of adjacent slits is 10 mm or more.

9. The glass according to claim 1, wherein a visible light transmittance Tv of the information transmitting/receiving area including the film is 70% or more.

10. The glass according to claim 1, wherein a haze of the information transmitting/receiving area including the film is 1% or less.

11. The glass according to claim 1, wherein the heating element is formed from gold, silver, copper, or tin-doped indium oxide.

12. The glass according to claim 1, wherein the busbar is formed from (i) at least one metal selected from the group consisting of silver, copper, tin, gold, aluminum, iron, tungsten, and chromium, (ii) an alloy containing two or more metals selected from the group, or (iii) a conductive organic polymer.

13. The glass according to claim 1, wherein the substrate is formed from at least one material selected from the group consisting of polyester, polyamide, polyether, polysulfone, polyethersulfone, polycarbonate, polyarylate, polyetherimide, polyetherether ketone, polyimide, aramid, polybutylene terephthalate, polyvinyl butyral, and polyethylvinyl acetate.

14. The glass according to claim 1, wherein a thickness of the substrate is 5 µm or more and 500 µm or less.

15. The glass according to claim 1,
wherein a first busbar that is shared in the two or more of the heating areas is connected along a first end of a first heating area,
wherein a second busbar is connected along a second end of the first heating area,
wherein the shared first busbar is connected along a first end of a second heating area, and
wherein a third busbar is connected along a second end of the second heating area.

16. The glass according to claim 1, wherein a non-contact power supply is configured to supply power to the heating element.

17. The glass according to claim 1,
wherein a windshield is a laminated glass for a vehicle, the laminated glass includes an inner glass plate that is a vehicle-interior side, an outer glass plate that is a vehicle-exterior side, an intermediate film, a shielding layer, and a film, and
wherein the film is attached to an area of the inner glass plate.

18. The glass according to claim 1, wherein an edge of the film is colored.

19. The glass according to claim 1, wherein the windshield includes the shielding layer, and wherein an edge of the shielding ayer overlaps the edge of the film by 1 mm or more in a planar view.

* * * * *